US009394739B2

(12) United States Patent
Ogawa et al.

(10) Patent No.: US 9,394,739 B2
(45) Date of Patent: Jul. 19, 2016

(54) WINDOW OPENING-CLOSING CONTROL SYSTEM AND WINDOW OPENING-CLOSING CONTROL APPARATUS

(71) Applicants: Daisuke Ogawa, Aichi (JP); Katsunori Kigoshi, Aichi (JP); Kenji Sato, Osaka (JP); Hidekazu Imai, Dublin, OH (US); Atsushi Fujita, Aichi (JP); Akihiro Kakamu, Gifu (JP); Naoyuki Yokoyama, Aichi (JP); Yosuke Yamamoto, Aichi (JP)

(72) Inventors: Daisuke Ogawa, Aichi (JP); Katsunori Kigoshi, Aichi (JP); Kenji Sato, Osaka (JP); Hidekazu Imai, Dublin, OH (US); Atsushi Fujita, Aichi (JP); Akihiro Kakamu, Gifu (JP); Naoyuki Yokoyama, Aichi (JP); Yosuke Yamamoto, Aichi (JP)

(73) Assignee: OMRON AUTOMOTIVE ELECTRONICS CO., LTD., Aichi (JP)

( * ) Notice: Subject to any disclaimer, the term of this patent is extended or adjusted under 35 U.S.C. 154(b) by 0 days.

(21) Appl. No.: 14/790,548

(22) Filed: Jul. 2, 2015

(65) Prior Publication Data

US 2016/0002969 A1 Jan. 7, 2016

(30) Foreign Application Priority Data

Jul. 3, 2014 (JP) ................................ 2014-137583

(51) Int. Cl.

| | |
|---|---|
| ***B60J 1/16*** | (2006.01) |
| ***B60J 9/00*** | (2006.01) |
| ***E05F 15/695*** | (2015.01) |

(52) U.S. Cl.

CPC .................................. *E05F 15/695* (2015.01)

(58) Field of Classification Search

CPC ......... E05F 15/695; E05F 15/697; B60J 1/16; B60J 9/00

USPC .......................................................... 318/280

See application file for complete search history.

(56) References Cited

U.S. PATENT DOCUMENTS

| | | | | |
|---|---|---|---|---|
| 5,977,732 | A * | 11/1999 | Matsumoto .......... | H02H 7/0851 318/283 |
| 6,278,250 | B1 * | 8/2001 | Sasaki ................... | E05F 15/695 318/283 |
| 8,710,773 | B2 | 4/2014 | Kigoshi et al. | |
| 9,255,434 | B2 * | 2/2016 | Ozawa ................ | E05F 15/1684 |
| 9,257,918 | B2 * | 2/2016 | Kakuno .................... | H02P 1/22 |
| 2015/0376932 | A1 * | 12/2015 | Imai ........................ | E05F 15/73 701/49 |

FOREIGN PATENT DOCUMENTS

| | | | |
|---|---|---|---|
| JP | 06343279 | A | 12/1994 |
| JP | 2008-019625 | A | 1/2008 |
| JP | 2009-108493 | A | 5/2009 |
| JP | 2012-082647 | A | 4/2012 |

* cited by examiner

*Primary Examiner* — Kawing Chan
(74) *Attorney, Agent, or Firm* — Osha Liang LLP

(57) ABSTRACT

The invention improves detection accuracy of interposition at a vehicle window. An interposition detector determines that a window at a passenger's seat has interposition if motor current for opening and closing the window at the passenger's seat does not decrease to be less than a predetermined threshold but increases to be not less than a second threshold, or if the motor current does not decreases to be less than the predetermined threshold but increases at a predetermined or more increase rate. The interposition detector determines that the window at the passenger's seat does not have interposition if the motor current is less than the predetermine threshold. The invention is applicable to an automatic window system and the like.

6 Claims, 15 Drawing Sheets

WINDOW OPENING-CLOSING CONTROL SYSTEM AND WINDOW OPENING-CLOSING CONTROL APPARATUS

CROSS-REFERENCE TO RELATED APPLICATION

This application is based on Japanese Patent Application No. 2014-137583 filed with the Japan Patent Office on Jul. 3, 2014, the entire contents of which are incorporated herein by reference.

FIELD

The disclosure relates to a window opening-closing control system and a window opening-closing control apparatus, and particularly relates to a window opening-closing control system and a window opening-closing control apparatus configured to open and close, at a driver's seat, windows at vehicle seats in addition to the driver's seat.

BACKGROUND

In an automatic window system configured to open and close a vehicle window with an electric motor, the motor rotates positively or negatively in accordance with a state of operation to an operation switch, to open or close the window. For example, the motor rotates positively to close the window if the operation switch is operated to a close side (an UP side) whereas the motor rotates negatively to open the window if the operation switch is operated to an open side (a DOWN side). Positive and negative rotation of the motor is controlled by switching a direction of current flowing to the motor at a motor driving circuit in accordance with a signal transmitted from the operation switch.

An automobile is typically equipped with operation switches at a driver's seat and other seats (a front passenger's seat, a rear right passenger's seat, a rear left passenger's seat, and the like). The operation switch at the driver's seat (main switch) includes a driver's seat switch configured to open and close a driver's seat window as well as passenger's seat switches each configured to remotely open and close a corresponding one of passenger's seat windows. The operation switch at each of the passenger's seats (sub switch) is configured to open and close only the corresponding passenger's seat window. There is further provided a controller configured to control opening and closing the windows in accordance with operation to the main switch and the sub switches.

Window opening-closing control includes control to open or close a window only while an operation switch is operated (manual motion) and control to open or close a window until the window is fully opened or closed even if operation is stopped (automatic motion). An operation switch for automatic motion of the driver's seat window is typically provided only to the main switch whereas each of the sub switches is provided only with an operation switch for manual motion.

JP 2008-19625 A discloses a window opening-closing control apparatus that includes controllers provided respectively to a main switch at a driver's seat and sub switches at passenger's seats, and the controller for each of the seats is configured to control manual motion and automatic motion of a window at the corresponding seat. The controllers for the respective seats are connected via a serial communication line in the window opening-closing control apparatus. If the driver's seat main switch is operated to open or close one of passenger's seat windows, the controller for the driver's seat communicates to the controller for the corresponding seat via the serial communication line and the controller for this seat controls to drive a motor.

JP 06-343279 A discloses a window opening-closing control apparatus that includes a single controller configured to control a driving motor for a window at each seat in response to input to a main switch at a driver's seat or a sub switch at each passenger's seat. The sub switch at each passenger's seat is provided with an automatic switch. Operation to the automatic switch enables a window at the passenger's seat to open and close automatically.

JP 2009-108493 A discloses a window opening-closing control apparatus configured to detect a ripple of current flowing to a motor, to calculate rotational speed of the motor from its detection result, and to control to open and close a window.

JP 2012-82647 A discloses a window opening-closing control apparatus in which a control unit at a driver's seat (driver's seat unit) and control units at passenger's seats (passenger's seat units) are connected to each other by a single signal line.

This window opening-closing control apparatus switches a direction of current flowing to a motor with contacts of a window close switch and a window open switch at one of the passenger's seat units when window opening-closing operation is performed at the driver's seat unit.

SUMMARY

An automatic window system typically has an interposition preventing function of detecting whether or not an object such as a finger or a hand is interposed between each vehicle window and a vehicle body when the window is closed, and reversely moving the window if interposition is detected. Such an automatic window system is desired to improve interposition detection accuracy so as to, for example, prevent reverse motion of the window due to erroneous detection although no interposition has occurred.

One or more embodiments of the disclosure enable a control apparatus at a driver's seat to automatically open and close a passenger's seat window with an operation switch that is provided at the passenger's seat, includes a contact for manual operation, and is not provided with any member for automatic operation, as well as to detect interposition at the passenger's seat window. One or more embodiments of the disclosure also prevent erroneous interposition detection upon detecting interposition at the passenger's seat window in accordance with a ripple of motor current.

One or more embodiments of the disclosure provide a window opening-closing control system configured to control opening and closing a window at a driver's seat and a window at a passenger's seat other than the driver's seat in a vehicle, the window opening-closing control system including: a passenger's seat unit provided at the passenger's seat; and a window opening-closing control apparatus provided at the driver's seat; the passenger's seat unit including: a momentary passenger's seat sub switch having a first contact operated to close the window at the passenger's seat and a second contact operated to open the window at the passenger's seat; the first contact including: a first common terminal connected to a first end of a passenger's seat motor configured to open and close the window at the passenger's seat; a first normally opened terminal connected to a positive electrode of a power supply of the vehicle via a first wire, and connected to the first common terminal in response to operation for closing the window at the passenger's seat; and a first normally closed terminal; the second contact including: a second common terminal connected to a second end of the passenger's seat motor; a second normally opened terminal connected to the positive electrode of the power supply via the first wire, and connected to the second common terminal in response to operation for opening the window at the passenger's seat; and a second normally closed terminal; the window opening-closing control apparatus including: a driver's seat main switch operated to open and close the window at the driver's seat; a passenger's seat main switch having a third contact operated to close the window at the passenger's seat and a fourth contact operated to open the window at the passenger's seat, the passenger's seat main switch operated to open and close the window at the passenger's seat; a motor current detector configured to detect current flowing to the passenger's seat motor; a first relay circuit unit having a first relay contact and configured to be driven to close the window at the passenger's seat, the first relay contact including: a first common relay terminal connected to the first normally closed terminal via a second wire; a first normally opened relay terminal connected to the positive electrode of the power supply; and a first normally closed relay terminal connected to ground; a second relay circuit unit having a second relay contact and configured to be driven to open the window at the passenger's seat, the second relay contact including: a second common relay terminal connected to the second normally closed terminal via a third wire; a second normally opened relay terminal connected to the positive electrode of the power supply; and a second normally closed relay terminal connected to ground; an operation detector configured to detect operation to the driver's seat main switch and the passenger's seat main switch in accordance with a signal received from the driver's seat main switch and the passenger's seat main switch; an opening-closing controller configured to control the first relay circuit unit and the second relay circuit unit in accordance with the operation to the passenger's seat main switch; and an interposition detector configured to detect a period of a ripple of the motor current detected by the motor current detector and to detect interposition at the window at the passenger's seat in accordance with a change of the period; in which when the first relay circuit unit or the second relay circuit unit is driven, the interposition detector does not determine that the window at the passenger's seat has interposition but determines that the passenger's seat sub switch is operated if the period of the ripple is not less than a predetermined period and the motor current decreases to be less than a predetermined first threshold.

When the period of the ripple of the motor current is detected, interposition at the window at the passenger's seat is detected in accordance with the change of the period, and one of the first relay circuit unit and the second relay circuit unit is driven, the window opening-closing control system according to one or more embodiments of the disclosure does not determine that interposition occurs at the window at the passenger's seat but determines that the passenger's seat sub switch is operated if the period of the ripple is not less than the predetermined period and the motor current decreases to be less than the predetermined first threshold.

This configuration thus enables the control apparatus at the driver's seat to automatically open and close the window at the passenger's seat with the operation switch that is provided at the passenger's seat, includes the contact for manual operation, and is not provided with any member for automatic operation, as well as to detect interposition at the window at the passenger's seat. This configuration also prevents erroneous interposition detection upon detecting interposition at the window at the passenger's seat in accordance with the ripple of the motor current.

The open-close part can be embodied by a relay, a switch, or the like. The power supply can be embodied by a battery or the like. The operation detector, the opening-closing controller, and the interposition detector can be each embodied by a CPU or the like.

The interposition detector can determine that the window at the passenger's seat has interposition if the period of the ripple is not less than the predetermined period and the motor current increases to be not less than a predetermined second threshold without decreasing to be less than the first threshold, or if the period of the ripple is not less than the predetermined period and the motor current increases at a predetermined or more increase rate without decreasing to be less than the first threshold.

This configuration further improves interposition detection accuracy.

The operation detector can determine that the operation for closing the window at the passenger's seat is performed to the passenger's seat sub switch if the motor current decreases to be less than the first threshold and then increases to be not less than a predetermined third threshold larger than the first threshold within a predetermined first prescribed time period while the operation for closing the window at the passenger's seat is performed to the passenger's seat main switch, and can determine that the operation for opening the window at the passenger's seat is performed to the passenger's seat sub switch if the motor current decreases to be less than the first threshold and is then less than the first threshold continuously for not less than a predetermined second prescribed time period while the operation for closing the window at the passenger's seat is performed to the passenger's seat main switch.

This configuration achieves detection of a reason for decrease in motor current with no reference to information on the contact of the passenger's seat operation switch.

The window opening-closing control apparatus can further include: a window position detector configured to detect a position of the window at the passenger's seat in an opening-closing direction in accordance with the ripple of the motor current.

This configuration achieves detection of the position of the window at the passenger's seat in the opening-closing direction with no use of any sensor.

The window position detector can be embodied by a CPU or the like.

The motor current detector can be embodied by a resistor provided on a route of the flowing motor current.

This simple configuration achieves detection of the motor current.

One or more embodiments of the disclosure also provide a window opening-closing control apparatus connected via second and third wires to a passenger's seat unit provided at a passenger's seat other than a driver's seat in a vehicle, the passenger's seat unit including: a momentary passenger's seat sub switch having a first contact operated to close a window at the passenger's seat and a second contact operated to open the window at the passenger's seat; the first contact including: a first common terminal connected to a first end of a passenger's seat motor configured to open and close the window at the passenger's seat; a first normally opened terminal connected to a positive electrode of a power supply of the vehicle via a first wire, and connected to the first common terminal in response to operation for closing the window at the passenger's seat; and a first normally closed terminal; the second contact including: a second common terminal connected to a second end of the passenger's seat motor; a second normally opened terminal connected to the positive electrode of the power supply via the first wire, and connected to the second common terminal in response to operation for opening the window at the passenger's seat; and a second normally closed terminal; the window opening-closing control apparatus provided at the driver's seat in the vehicle and configured to control opening and closing a window at the driver's seat and the window at the passenger's seat; the window opening-closing control apparatus including: a driver's seat main switch operated to open and close the window at the driver's seat; a passenger's seat main switch having a third contact operated to close the window at the passenger's seat and a fourth contact operated to open the window at the passenger's seat, the passenger's seat main switch operated to open and close the window at the passenger's seat; a motor current detector configured to detect current flowing to the passenger's seat motor; a first relay circuit unit having a first relay contact and configured to be driven to close the window at the passenger's seat, the first relay contact including: a first common relay terminal connected to the first normally closed terminal via the second wire; a first normally opened relay terminal connected to the positive electrode of the power supply; and a first normally closed relay terminal connected to ground; a second relay circuit unit having a second relay contact and configured to be driven to open the window at the passenger's seat, the second relay contact including: a second common relay terminal connected to the second normally closed terminal via the third wire; a second normally opened relay terminal connected to the positive electrode of the power supply; and a second normally closed relay terminal connected to ground; an operation detector configured to detect operation to the driver's seat main switch and the passenger's seat main switch in accordance with a signal received from the driver's seat main switch and the passenger's seat main switch; an opening-closing controller configured to control the first relay circuit unit and the second relay circuit unit in accordance with the operation to the passenger's seat main switch; and an interposition detector configured to detect a period of a ripple of the motor current detected by the motor current detector and to detect interposition at the window at the passenger's seat in accordance with a change of the period; in which when the first relay circuit unit or the second relay circuit unit is driven, the interposition detector does not determine that the window at the passenger's seat has interposition but determines that the passenger's seat sub switch is operated if the period of the ripple is not less than a predetermined period and the motor current decreases to be less than a predetermined threshold.

When the period of the ripple of the motor current is detected, interposition at the window at the passenger's seat is detected in accordance with the change of the period, and one of the first relay circuit unit and the second relay circuit unit is driven, the window opening-closing control apparatus according to one or more embodiments of the disclosure does not determine that interposition occurs at the window at the passenger's seat but determines that the passenger's seat sub switch is operated if the period of the ripple is not less than the predetermined period and the motor current decreases to be less than the predetermined threshold.

This configuration thus enables the control apparatus at the driver's seat to automatically open and close the window at the passenger's seat with the operation switch that is provided at the passenger's seat, includes the contact for manual operation, and is not provided with any member for automatic operation, as well as to detect interposition at the window at the passenger's seat. This configuration also prevents erroneous interposition detection upon detecting interposition at the window at the passenger's seat in accordance with the ripple of the motor current.

The open-close part can be embodied by a relay, a switch, or the like. The power supply can be embodied by a battery or the like. The operation detector, the opening-closing controller, and the interposition detector can be each embodied by a CPU or the like.

One or more embodiments of the disclosure enable the control apparatus at the driver's seat to automatically open and close the window at the passenger's seat with the operation switch that is provided at the passenger's seat, includes the contact for manual operation, and is not provided with any member for automatic operation, as well as to detect interposition at the window at the passenger's seat. The present invention also prevents erroneous interposition detection upon detection of interposition at the window at the passenger's seat in accordance with the ripple of the motor current.

DETAILED DESCRIPTION

Embodiments of the disclosure (hereinafter, referred to as an embodiment) will now be described below. In embodiments of the disclosure, numerous specific details are set forth in order to provide a more through understanding of the invention. However, it will be apparent to one of ordinary skill in the art that the invention may be practiced without these specific details. In other instances, well-known features have not been described in detail to avoid obscuring the invention. Description will be made in the following order.

1. Embodiment
2. Modification examples

1. Embodiment

Exemplary Configuration of Automatic Window System 1

Figure 1:
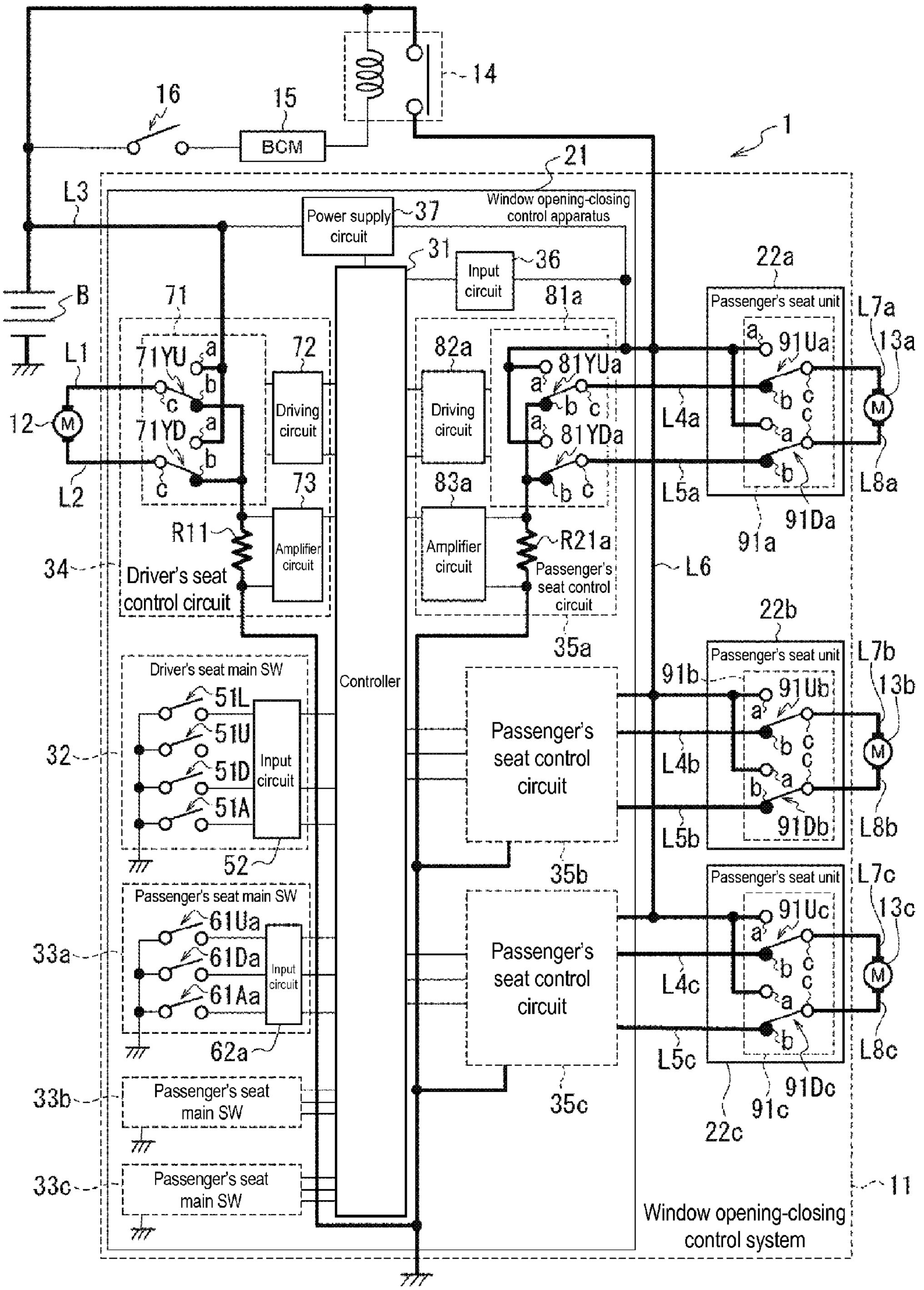
FIG. 1 is a circuit diagram of an automatic window system according to one or more embodiments of the disclosure.

FIG. 1 is a circuit diagram depicting an exemplary configuration of the automatic window system 1, as an automatic window system according to one or more embodiments of the disclosure. The following description relates to a case where the automatic window system 1 opens and closes four vehicle windows at a driver's seat, a front passenger's seat, a rear right passenger's seat, and a rear left passenger's seat.

The window at the driver's seat, the window at the front passenger's seat, the window at the rear right passenger's seat, and the window at the rear left passenger's seat will be also simply referred to as the driver's seat window, the front passenger's seat window, the rear right passenger's seat window, and the rear left passenger's seat window, respectively. Each of the seats other than the driver's seat will be generically referred to as a passenger's seat.

The automatic window system 1 includes a window opening-closing control system 11, a motor 12, motors 13*a* to 13*c*, a main relay 14, a body control module (BCM) 15, an ignition switch 16, and a power supply B.

The window opening-closing control system 11 includes an operation unit configured to open and close a vehicle window. The window opening-closing control system 11 controls turning ON/OFF and a direction of motor current flowing to each of the motors 12 and 13*a* to 13*c* in accordance with operation to the operation unit, so as to control opening and closing each vehicle window. The motor 12 is configured to open and close the driver's seat window, whereas the motors 13*a* to 13*c* are configured to open and close the front passenger's seat window, the rear right passenger's seat window, and the rear left passenger's seat window, respectively.

The main relay 14 opens and closes an electric circuit from the power supply B to each of the motors 13*a* to 13*c* under the control of the BCM 15. Specifically, the BCM 15 turns ON a contact of the main relay 14 if the ignition switch 16 is turned ON. Motor current can be supplied from the power supply B to each of the motors 13*a* to 13*c* in this case, to open and close the front passenger's seat window and the rear right and rear left passenger's seat windows. In contrast, the BCM 15 turns OFF the contact of the main relay 14 if the ignition switch 16 is turned OFF. Motor current cannot be supplied from the power supply B to each of the motors 13*a* to 13*c* in this case, so as not to open and close the front passenger's seat window and the rear right and rear left passenger's seat windows.

The power supply B can be configured as a battery provided to the vehicle, and supplies driving power for each unit in the automatic window system 1.

The window opening-closing control system 11 includes a window opening-closing control apparatus 21, and passenger's seat units 22*a* to 22*c*. The passenger's seat units 22*a* to 22*c* are connected to a positive electrode of the power supply B via the main relay 14.

The window opening-closing control apparatus 21 is disposed near the driver's seat (e.g. inside a door at the driver's seat), and is configured to open and close, at the driver's seat, the driver's seat window and the passenger's seat windows. The window opening-closing control apparatus 21 can be configured as a single unit including a single case and respective components accommodated therein.

The passenger's seat unit 22*a* is disposed near the front passenger's seat (e.g. inside a door at the front passenger's seat), and is configured to open and close the front passenger's seat window at the front passenger's seat.

The passenger's seat unit 22*b* is disposed near the rear right passenger's seat (e.g. inside a door at the rear right passenger's seat), and is configured to open and close the rear right passenger's seat window at the rear right passenger's seat.

The passenger's seat unit 22*c* is disposed near the rear left passenger's seat (e.g. inside a door at the rear left passenger's seat), and is configured to open and close the rear left passenger's seat window at the rear left passenger's seat.

The window opening-closing control apparatus 21 includes a controller 31, a driver's seat main switch 32, passenger's seat main switches 33*a* to 33*c*, a driver's seat control circuit 34, passenger's seat control circuits 35*a* to 35*c*, an input circuit 36, and a power supply circuit 37.

The controller 31 can be configured as a central processing unit (CPU), for example. The controller 31 controls the driver's seat control circuit 34 and the passenger's seat control circuits 35*a* to 35*c* in accordance with operation to the driver's seat main switch 32 and the passenger's seat main switches 33*a* to 33*c*, so as to control opening and closing the vehicle windows. The controller 31 also detects a motion direction of each window (whether it is opening or closing), a position of each window in an opening-closing direction (hereinafter, simply referred to as a position of each window), and interposition, in accordance with detection results and the like on motor current supplied from the driver's seat control circuit 34 and the passenger's seat control circuits 35*a* to 35*c*. Interposition herein indicates a phenomenon that an object is interposed between a closing window and a vehicle body.

The driver's seat main switch 32 is a momentary operation switch configured to open and close the driver's seat window at the driver's seat. The driver's seat main switch 32 includes contacts 51L, 51U, 51D, and 51A, as well as an input circuit 52.

The contact 51L is of a normally opened type and is operated to set a locking function of invalidating operation to passenger's seat sub switches 91*a* to 91*c* in the passenger's seat units 22*a* to 22*c*. The contact 51L is turned ON if operation for setting the locking function is performed, and is turned OFF if operation for canceling the locking function is performed.

The contact 51U is of the normally opened type and is operated to close the driver's seat window. The contact 51U is turned ON if closing operation for closing the driver's seat window is performed to the driver's seat main switch 32, and is turned OFF if the closing operation is not performed.

The contact 51D is of the normally opened type and is operated to open the driver's seat window. The contact 51D is turned ON if opening operation for opening the driver's seat window is performed to the driver's seat main switch 32, and is turned OFF if the opening operation is not performed.

The contact 51A is of the normally opened type and is operated to automatically open and close the driver's seat window. The contact 51A is turned ON if closing operation for automatically closing the driver's seat window (hereinafter, referred to as automatically closing operation) or opening operation for automatically opening the driver's seat window (hereinafter, referred to as automatically opening operation) is performed to the driver's seat main switch 32.

Closing operation for manually closing a window will be also referred to as manually closing operation in comparison to the automatically closing operation, whereas opening operation for manually opening a window will be also referred to as manually opening operation.

The manual operation and the automatic operation to the driver's seat main switch 32 are performed in different manners according to specifications of the switch. For example, the manual operation and the automatic operation are distinguished from each other depending on stress of the operation to an operation knob (not depicted) of the driver's seat main switch 32. The manually closing operation can be performed by lightly pulling upward the operation knob, and the automatically closing operation can be performed by applying more force to further heavily pull upward the operation knob, for example. In contrast, the manually opening operation can be performed by lightly pushing the operation knob, and the automatically opening operation can be performed by applying more force to further heavily push the operation knob, for example.

Alternatively, the manual operation and the automatic operation are distinguished from each other depending on operation time periods to the operation knob of the driver's seat main switch. The manually closing operation can be performed by pulling upward the operation knob for less than a predetermined time period, and the automatically closing operation can be performed by pulling upward the operation knob for not less than the predetermined time period, for example. In contrast, the manually opening operation can be performed by pushing the operation knob for less than the predetermined time period, and the automatically opening operation can be performed by pushing the operation knob for not less than the predetermined time period.

The input circuit 52 transmits, to the controller 31, signals indicating states of the contacts 51L, 51U, 51D, and 51A.

The passenger's seat main switch 33*a* is a momentary operation switch configured to open and close the front passenger's seat window at the driver's seat. The passenger's seat main switch 33*a* includes contacts 61Ua, 61Da, and 61Aa, as well as an input circuit 62*a*.

The contact 61Ua is of the normally opened type and is operated to close the front passenger's seat window. The contact 61Ua is turned ON if the closing operation for closing the front passenger's seat window is performed to the passenger's seat main switch 33*a*, and is turned OFF if the closing operation is not performed.

The contact 61Da is of the normally opened type and is operated to open the front passenger's seat window. The contact 61Da is turned ON if the opening operation for opening the front passenger's seat window is performed to the passenger's seat main switch 33*a*, and is turned OFF if the opening operation is not performed.

The contact 61Aa is of the normally opened type and is operated to automatically open and close the front passenger's seat window.

The contact 61Aa is turned ON if the automatically closing operation or the automatically opening operation is performed to the passenger's seat main switch 33*a*.

The manual operation and the automatic operation to the passenger's seat main switch 33*a* can be performed in manners similar to those of the manual operation and the automatic operation to the driver's seat main switch 32.

The input circuit 62*a* transmits, to the controller 31, signals indicating states of the contacts 61Ua, 61Da, and 61Aa.

The passenger's seat main switch 33*b* and the passenger's seat main switch 33*c* are momentary operation switches configured to open and close, at the driver's seat, the rear right passenger's seat and the rear left passenger's seat, respectively. The passenger's seat main switch 33*b* and the passenger's seat main switch 33*c* each have a circuit configuration similar to that of the passenger's seat main switch 33*a*, and will not be described or depicted repeatedly. The passenger's seat main switch 33*b* not depicted includes sections denoted by reference signs that are obtained by replacing the last letter "a" in the reference signs of the sections in the passenger's seat main switch 33*a* with the letter "b". The passenger's seat main switch 33*c* not depicted includes sections denoted by reference signs that are obtained by replacing the last letter "a" in the reference signs of the sections in the passenger's seat main switch 33*a* with the letter "c".

The driver's seat control circuit 34 controls the motor 12. The driver's seat control circuit 34 includes a switching circuit 71, a driving circuit 72, an amplifier circuit 73, and a resistor R11.

The switching circuit 71 includes a relay circuit 71U configured to be driven to close the driver's seat window (only a relay contact 71YU is depicted) and a relay circuit 71D configured to be driven to open the driver's seat window (only a relay contact 71YD is depicted).

The relay circuit 71U includes a coil 71XU (not depicted) and the relay contact 71YU serving as a transfer contact configured to be transferred in state by driving current flowing through the coil 71XU. The relay contact 71YU includes a normally opened terminal (NO terminal) a that is connected to the positive electrode of the power supply B via a wire L3. The relay contact 71YU includes a normally closed terminal (NC terminal) b that is connected to ground via the resistor R11. The relay contact 71YU includes a common terminal c that is connected to a first end of the motor 12 via a wire L1.

The relay circuit 71D includes a coil 71XD (not depicted) and the relay contact 71YD serving as a transfer contact configured to be transferred in state by driving current flowing through the coil 71XD. The relay contact 71YD includes a normally opened terminal (NO terminal) a that is connected to the positive electrode of the power supply B via the wire L3. The relay contact 71YD includes a normally closed terminal (NC terminal) b that is connected to ground via the resistor R11. The relay contact 71YD includes a common terminal c that is connected to a second end of the motor 12 via a wire L2.

The driving circuit 72 drives the relay circuits 71U and 71D under the control of the controller 31.

Specifically, the driving circuit 72 controls driving current to the coil 71XU of the relay circuit 71U and the coil 71XD of the relay circuit 71D under the control of the controller 31, so as to control the states of the relay contacts 71YU and 71YD.

The amplifier circuit 73 is connected to the both ends of the resistor R11. The amplifier circuit 73 amplifies voltage generated at the both ends of the resistor R11 by motor current at the motor 12 outputted from the switching circuit 71, and transmits the amplified voltage to the controller 31. The controller 31 monitors motor current at the motor 12 on the basis of voltage received from the amplifier circuit 73.

Hereinafter, the direction of motor current flowing through the relay contact 71YU, the motor 12, and the relay contact 71YD in the mentioned order will be called a forward direction whereas the direction of motor current flowing through the relay contact 71YD, the motor 12, and the relay contact 71YU in the mentioned order will be called a backward direction. Also, assume that the driver's seat window shifts upward and closes if motor current flows in the forward direction to the motor 12 and the driver's seat window shifts downward and opens if motor current flows in the backward direction to the motor 12.

The passenger's seat control circuit 35*a* controls the motor 13*a* via the passenger's seat unit 22*a*. The passenger's seat control circuit 35*a* includes a switching circuit 81*a*, a driving circuit 82*a*, an amplifier circuit 83*a*, and a resistor R21*a*.

The switching circuit 81*a* includes a relay circuit 81Ua configured to be driven to close the front passenger's seat window (only a relay contact 81YUa is depicted) and a relay circuit 81Da configured to be driven to open the front passenger's seat window (only a relay contact 81YDa is depicted).

The relay circuit 81Ua includes a coil 81XUa (not depicted) and the relay contact 81YUa serving as a transfer contact configured to be transferred in state by driving current flowing through the coil 81XUa. The relay contact 81YUa includes a normally opened terminal (NO terminal) a that is connected to the positive electrode of the power supply B via a wire L6 and the main relay 14. The relay contact 81YUa includes a normally closed terminal (NC terminal) b that is connected to ground via the resistor R21*a*. The relay contact 81YUa includes a common terminal c that is connected to a terminal b of a contact 91Ua in the passenger's seat sub switch 91*a* via a wire L4*a*.

The relay circuit 81Da includes a coil 81XDa (not depicted) and the relay contact 81YDa serving as a transfer contact configured to be transferred in state by driving current flowing through the coil 81XDa. The relay contact 81YDa includes a normally opened terminal (NO terminal) a that is connected to the positive electrode of the power supply B via the wire L6 and the main relay 14. The relay contact 81YDa includes a normally closed terminal (NC terminal) b that is connected to ground via the resistor R21*a*. The relay contact 81YDa includes a common terminal c that is connected to a terminal b of a contact 91Da in the passenger's seat sub switch 91*a* via a wire L5*a*.

The driving circuit 82*a* drives the relay circuits 81Ua and 81Da under the control of the controller 31. Specifically, the driving circuit 82*a* controls driving current to the coil 81XUa of the relay circuit 81Ua and the coil 81XDa of the relay circuit 81Da under the control of the controller 31, so as to control the states of the relay contacts 81YUa and 81YDa.

The amplifier circuit 83*a* is connected to the both ends of the resistor R21*a* serving as a motor current detector configured to detect motor current flowing to the motor 13*a*. The amplifier circuit 83*a* amplifies voltage generated at the both ends of the resistor R21*a* by motor current at the motor 13*a* outputted from the switching circuit 71, and transmits the amplified voltage to the controller 31. The controller 31 monitors motor current at the motor 13*a* on the basis of voltage received from the amplifier circuit 83*a*.

The passenger's seat control circuit 35*b* controls the motor 13*b* via the passenger's seat unit 22*b*, whereas the passenger's seat control circuit 35*c* controls the motor 13*c* via the passenger's seat unit 22*c*. The passenger's seat control circuit 35*b* and the passenger's seat control circuit 35*c* each have a circuit configuration similar to that of the passenger's seat control circuit 35*a*, and will not be described or depicted repeatedly. The passenger's seat control circuit 35*b* not depicted includes sections denoted by reference signs that are obtained by replacing the last letter "a" in the reference signs of the sections in the passenger's seat control circuit 35*a* with the letter "b". The passenger's seat control circuit 35*c* not depicted includes sections denoted by reference signs that are obtained by replacing the last letter "a" in the reference signs of the sections in the passenger's seat control circuit 35*a* with the letter "c".

The input circuit 36 is connected between the controller 31 and the wire L6 and sends part of current flowing through the wire L6 to the controller 31. Current is sent from the input circuit 36 to the controller 31 if the main relay 14 is ON. In contrast, current is not sent from the input circuit 36 to the controller 31 if the main relay 14 is OFF. The controller 31 can thus detect the ON/OFF state of the main relay 14 in accordance with current received from the input circuit 36.

The power supply circuit 37 is connected to the positive electrode of the power supply B via the wire L3 and is connected to the positive electrode of the power supply B via the wire L6 and the main relay 14 to supply each section in the window opening-closing control apparatus 21 with power from the power supply B.

The passenger's seat unit 22*a* includes the passenger's seat sub switch 91*a*.

The passenger's seat sub switch 91*a* is a momentary operation switch configured to open and close the front passenger's seat window at the front passenger's seat. The passenger's seat sub switch 91*a* includes the contacts 91Ua and 91Da.

The contact 91Ua serves as a transfer contact configured to be transferred if the passenger's seat sub switch 91*a* is operated to close the front passenger's seat window. The contact 91Ua includes a normally opened terminal (NO terminal) a that is connected to the positive electrode of the power supply B via the wire L6 and the main relay 14. The contact 91Ua includes a normally closed terminal (NC terminal) b that is connected to the terminal c of the relay contact 81YUa via the wire L4*a*. The contact 91Ua includes a common terminal c that is connected to a first end of the motor 13*a* via a wire L7*a*. For example, the terminal a and the terminal c are connected to each other if the closing operation for closing the front passenger's seat window is performed to the passenger's seat sub switch 91*a*, and the terminal b and the terminal c are connected to each other if the closing operation is not performed.

The contact 91Da serves as a transfer contact configured to be transferred if the passenger's seat sub switch 91*a* is operated to open the front passenger's seat window. The contact 91Da includes a normally opened terminal (NO terminal) a that is connected to the positive electrode of the power supply B via the wire L6 and the main relay 14. The contact 91Da includes a normally closed terminal (NC terminal) b that is connected to the terminal c of the relay contact 81YDa via the wire L5*a*. The contact 91Da includes a common terminal c that is connected to a second end of the motor 13*a* via a wire L8*a*. For example, the terminal a and the terminal c are connected to each other if the opening operation for opening the front passenger's seat window is performed to the passenger's seat sub switch 91*a*, and the terminal b and the terminal c are connected to each other if the opening operation is not performed.

Hereinafter, the direction of motor current flowing through the contact 91Ua, the motor 13*a*, and the contact 91Da in the mentioned order will be called a forward direction whereas the direction of motor current flowing through the contact 91Da, the motor 13*a*, and the contact 91Ua in the mentioned order will be called a backward direction. Also, assume that the front passenger's seat window shifts upward and closes if motor current flows in the forward direction to the motor 13*a* and the front passenger's seat window shifts downward and opens if motor current flows in the backward direction to the motor 13*a*.

The passenger's seat units 22*b* and 22*c* each have a circuit configuration similar to that of the passenger's seat unit 22*a* and will not be described repeatedly.

The window opening-closing control apparatus 21 and the motor 12 are connected via the two wires L1 and L2. The window opening-closing control apparatus 21 and the passenger's seat units 22*a* to 22*c* are connected via six wires L4*a* to L4*c* and L5*a* to L5*c*. The window opening-closing control apparatus 21 can be thus easily connected to the motor 12 and the passenger's seat units 22*a* to 22*c* in the vehicle via such a small number of wires.

As depicted in FIG. 1, the window opening-closing control apparatus 21 and the passenger's seat units 22*a* to 22*c* are connected via the wire L6, which connects the main relay 14, the window opening-closing control apparatus 21, and the passenger's seat units 22*a* to 22*c*. Accordingly, the window opening-closing control apparatus 21 and the passenger's seat units 22*a* to 22*c* are not necessarily connected directly via the wire L6.

Hereinafter, the motors 13*a* to 13*c* will be each simply referred to as the motor 13 if there is no need to distinguish the motors 13*a* to 13*c* from one another. Furthermore, the passenger's seat units 22*a* to 22*c*, the passenger's seat main switches 33*a* to 33*c*, and the passenger's seat control circuits 35*a* to 35*c* will be each simply referred to as the passenger's seat unit 22, the passenger's seat main switch 33, and the passenger's seat control circuit 35, respectively, if there is no need to distinguish the passenger's seat units 22*a* to 22*c*, the passenger's seat main switches 33*a* to 33*c*, and the passenger's seat control circuits 35*a* to 35*c* from one another.

Moreover, if there is no need to distinguish the sections in the passenger's seat units 22*a* to 22*c*, the passenger's seat main switches 33*a* to 33*c*, and the passenger's seat control circuits 35*a* to 35*c* from one another, respectively, these sections will be denoted by reference signs that are obtained by removing the last letters "a" to "c". For example, the passenger's seat sub switches 91*a* to 91*c* in the passenger's seat units 22*a* to 22*c* will be each simply referred to as the passenger's seat sub switch 91 if there is no need to distinguish the passenger's seat sub switches 91*a* to 91*c* from one another.

Connecting the terminal a and the terminal c at a transfer contact (turning ON an a contact) will be hereinafter referred to as turning ON the transfer contact. For example, connecting the terminal a and the terminal c at the contact 91Ua will be hereinafter referred to as turning ON the contact 91Ua. Similarly, connecting the terminal b and the terminal c at a transfer contact (turning ON a b contact) will be hereinafter referred to as turning OFF the transfer contact. For example, connecting the terminal b and the terminal c at the contact 91Ua will be hereinafter referred to as turning OFF the contact 91Ua.

{Exemplary Functional Configurations in Controller 31}

Figure 2:
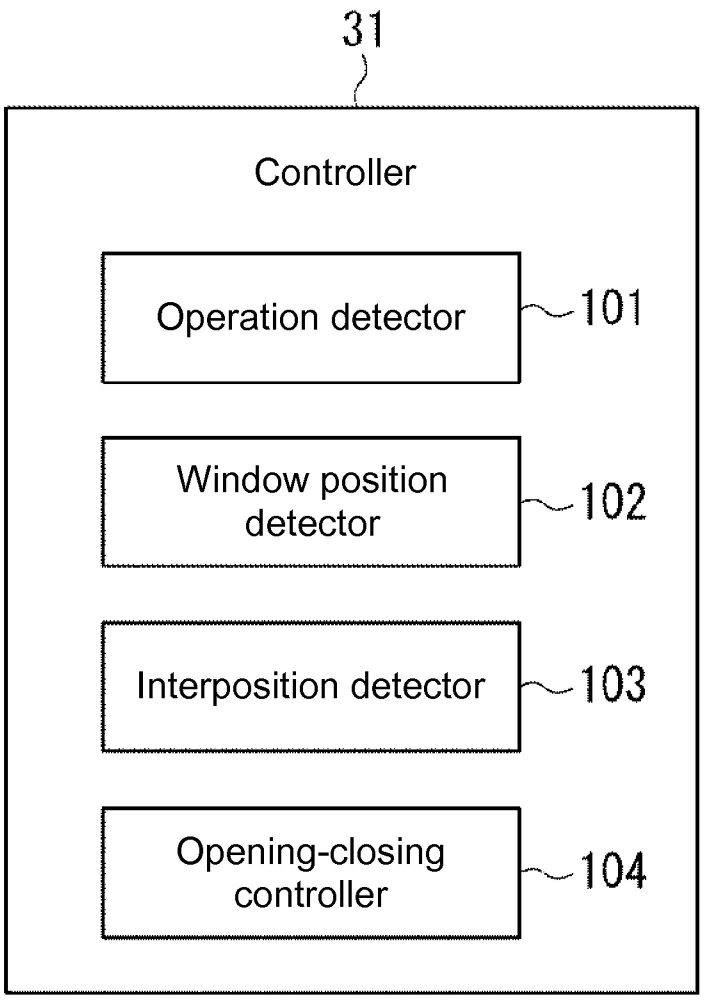
FIG. 2 is a block diagram depicting exemplary functional configurations in a controller.

FIG. 2 depicts exemplary functional configurations in the controller 31. The controller 31 includes an operation detector 101, a window position detector 102, an interposition detector 103, and an opening-closing controller 104. FIG. 2 depicts only part of the functional configurations in the controller 31, which will be described hereinafter.

The operation detector 101 detects operation to the driver's seat main switch 32 and the passenger's seat main switches 33*a* to 33*c* in accordance with signals transmitted from the input circuits 52 and 62*a* to 62*c*. The operation detector 101 monitors motor current at the motors 13*a* to 13*c* on the basis of voltage received from the amplifier circuits 83*a* to 83*c*, respectively. The operation detector 101 detects operation to the passenger's seat sub switches 91*a* to 91*c* in accordance with motor current at the motors 13*a* to 13*c*, respectively. The operation detector 101 transmits the detection results to the respective sections in the controller 31.

The window position detector 102 monitors motor current at the motors 12 and 13*a* to 13*c* on the basis of voltage received from the amplifier circuits 73 and 83*a* to 83*c*, respectively. The window position detector 102 detects positions and motion directions of the respective vehicle seat windows in accordance with the motor current at the motors 12 and 13*a* to 13*c* as well as the detection results on the operation to the driver's seat main switch 32 and the passenger's seat main switches 33*a* to 33*c*. The window position detector 102 transmits the detection results to the respective sections in the controller 31.

The interposition detector 103 monitors motor current at the motors 12 and 13*a* to 13*c* on the basis of voltage received from the amplifier circuits 73 and 83*a* to 83*c*, respectively. The interposition detector 103 detects interposition at the respective windows in accordance with the motor current at the motors 12 and 13*a* to 13*c*, the detection results on the operation to the driver's seat main switch 32 and the passenger's seat main switches 33*a* to 33*c*, and the detection results on the positions and the motion directions of the respective vehicle seat windows. The interposition detector 103 transmits the detection results to the respective sections in the controller 31.

The opening-closing controller 104 controls opening and closing the respective vehicle windows in accordance with the operation to the driver's seat main switch 32, the passenger's seat main switches 33*a* to 33*c*, and the passenger's seat sub switches 91*a* to 91*c*, as well as the detection results on the positions and the motion directions of the respective windows and the interposition at the respective windows. Specifically, the opening-closing controller 104 controls the driving circuit 72 and the relay circuits 71U and 71D, so as to control motor current at the motor 12 as well as opening and closing the driver's seat window. The opening-closing controller 104 also controls the driving circuits 82*a* to 82*c* and the relay circuits 81Ua to 81Uc and 81Da to 81Dc, so as to control motor current at the motors 13*a* to 13*c* as well as opening and closing the front passenger's seat, the rear right passenger's seat, and the rear left passenger's seat.

{Basic Motion of Automatic Window System 1}

Basic motion of the automatic window system 1 will be described next with reference to FIGS. 3 to 8. FIGS. 3 to 8 do not include sections and reference signs not particularly needed in the description.

{When Closing Operation is Performed to Driver's Seat Main Switch 32}

Figure 3:
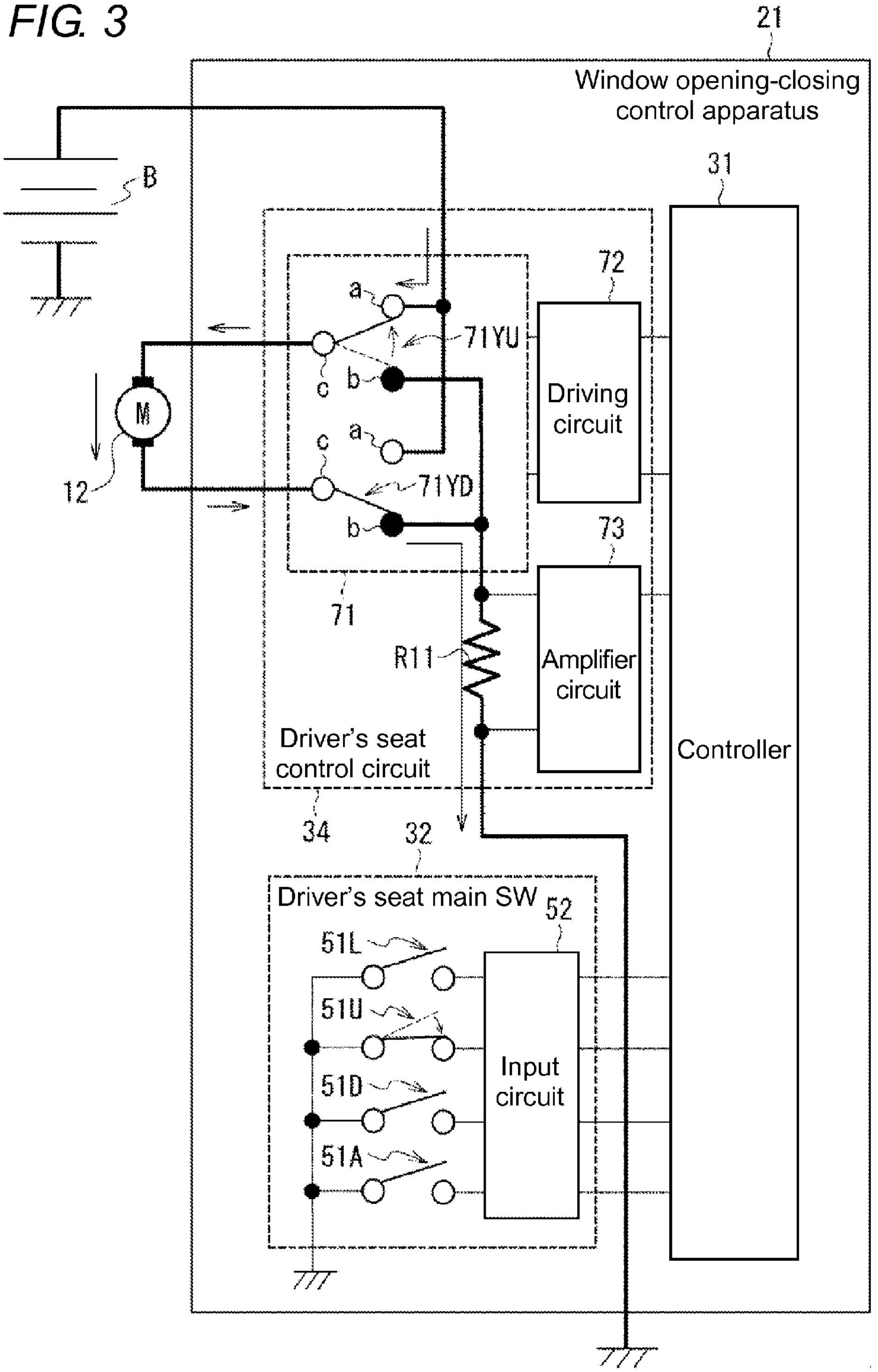
FIG. 3 is a diagram depicting a state of the automatic window system when manually closing operation is performed to a driver's seat main switch.

FIG. 3 depicts a state of the automatic window system 1 when the manually closing operation is performed to the driver's seat main switch 32.

If the manually closing operation is performed to the driver's seat main switch 32, the contact 51U is turned ON. If the operation detector 101 detects that the contact 51U is ON, the opening-closing controller 104 turns ON the relay contact 71YU via the driving circuit 72. In this case, current flows from the power supply B to ground via the terminal a of the relay contact 71YU, the motor 12, the terminal b of the relay contact 71YD, and the resistor R11. This causes motor current to flow in the forward direction to the motor 12, so as to close the driver's seat window.

If the manually closing operation to the driver's seat main switch 32 is stopped, the contact 51U is turned OFF. If the operation detector 101 detects that the contact 51U is OFF, the opening-closing controller 104 turns OFF the relay contact 71YU via the driving circuit 72. This stops supply of motor current to the motor 12 so as to stop the closing motion of the driver's seat window.

If the automatically closing operation is performed to the driver's seat main switch 32, the contacts 51U and 51A are turned ON. Similarly to the case where the manually closing operation is performed, the relay contact 71YU is turned ON and motor current flows in the forward direction to the motor 12, so as to close the driver's seat window.

Even when the automatically closing operation to the driver's seat main switch 32 is subsequently stopped and the contacts 51U and 51A are turned OFF, the opening-closing controller 104 keeps the state where the relay contact 71YU is ON via the driving circuit 72 until the driver's seat window is fully closed. The driver's seat window is thus automatically fully closed.

If the manually opening operation or the automatically opening operation is performed to the driver's seat main switch 32 while the driver's seat window is automatically closing and the operation detector 101 detects that the contact 51D is ON, the opening-closing controller 104 turns OFF the relay contact 71YU via the driving circuit 72. This stops the automatically closing motion of the driver's seat window.

{When Opening Operation is Performed to Driver's Seat Main Switch 32}

Figure 4:
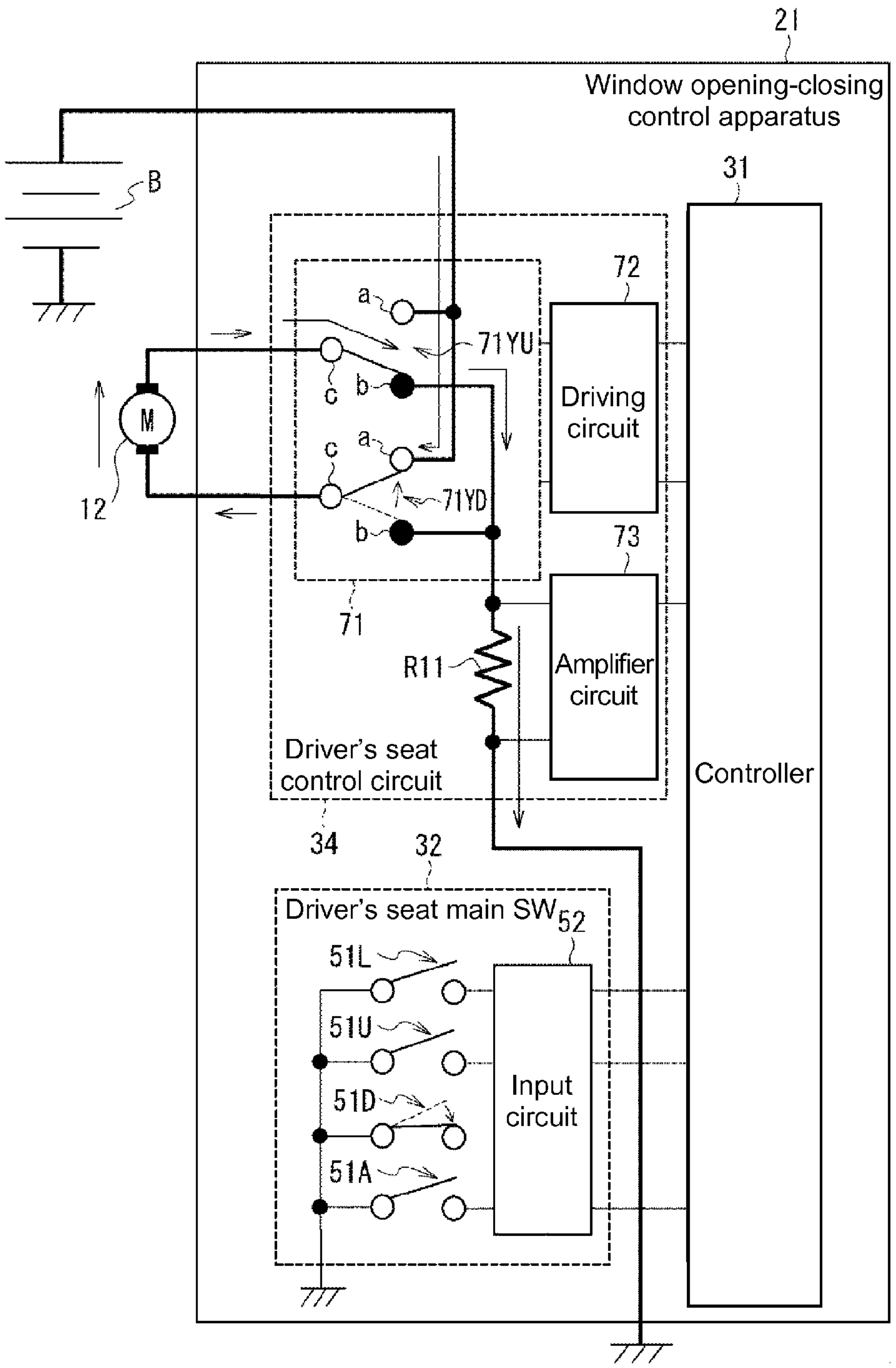
FIG. 4 is a diagram depicting a state of the automatic window system when manually opening operation is performed to the driver's seat main switch.

FIG. 4 depicts a state of the automatic window system 1 when the manually opening operation is performed to the driver's seat main switch 32.

If the manually opening operation is performed to the driver's seat main switch 32, the contact 51D is turned ON. If the operation detector 101 detects that the contact 51D is ON, the opening-closing controller 104 turns ON the relay contact 71YD via the driving circuit 72. In this case, current flows from the power supply B to ground via the terminal a of the relay contact 71YD, the motor 12, the terminal b of the relay contact 71YU, and the resistor R11. This causes motor current to flow in the backward direction to the motor 12, so as to open the driver's seat window.

If the manually opening operation to the driver's seat main switch 32 is stopped, the contact 51D is turned OFF. If the operation detector 101 detects that the contact 51D is OFF, the opening-closing controller 104 turns OFF the relay contact 71YD via the driving circuit 72. This stops supply of motor current to the motor 12 so as to stop the opening motion of the driver's seat window.

If the automatically opening operation is performed to the driver's seat main switch 32, the contacts 51D and 51A are turned ON. Similarly to the case where the manually opening operation is performed, the relay contact 71YD is turned ON and motor current flows in the backward direction to the motor 12, so as to open the driver's seat window. Even when the automatically opening operation to the driver's seat main switch 32 is subsequently stopped and the contacts 51D and 51A are turned OFF, the opening-closing controller 104 keeps the state where the relay contact 71YD is ON via the driving circuit 72 until the driver's seat window is fully opened. The driver's seat window is thus automatically fully opened.

If the manually closing operation or the automatically closing operation is performed to the driver's seat main switch 32 while the driver's seat window is automatically opening and the operation detector 101 detects that the contact 51U is ON, the opening-closing controller 104 turns OFF the relay contact 71YD via the driving circuit 72. This stops the automatically opening motion of the driver's seat window.

{When Closing Operation is Performed to Passenger's Seat Main Switch 33*a*}

Figure 5:
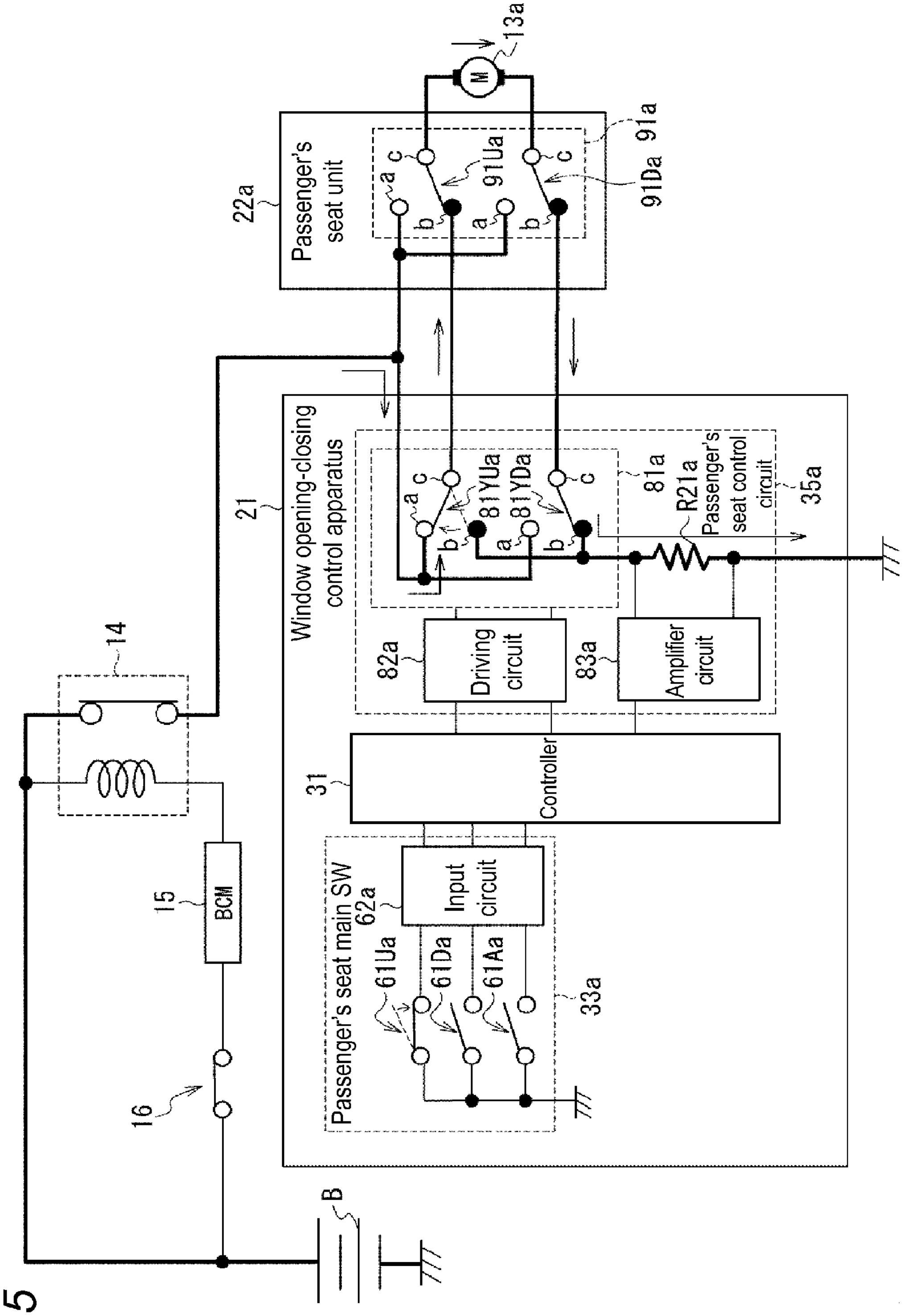
FIG. 5 is a diagram depicting a state of the automatic window system when the manually closing operation is performed to a passenger's seat main switch.

FIG. 5 depicts a state of the automatic window system 1 when the manually closing operation is performed to the passenger's seat main switch 33*a*.

If the manually closing operation is performed to the passenger's seat main switch 33*a*, the contact 61Ua is turned ON. If the operation detector 101 detects that the contact 61Ua is ON, the opening-closing controller 104 turns ON the relay contact 81YUa via the driving circuit 82*a*. In this case, current flows from the power supply B to ground via the main relay 14, the terminal a of the relay contact 81YUa, the terminal b of the contact 91Ua, the motor 13*a*, the terminal b of the contact 91Da, the terminal b of the relay contact 81YDa, and the resistor R21*a*. This causes motor current to flow in the forward direction to the motor 13*a*, so as to close the front passenger's seat window.

If the manually closing operation to the passenger's seat main switch 33*a* is stopped, the contact 61Ua is turned OFF. If the operation detector 101 detects that the contact 61Ua is OFF, the opening-closing controller 104 turns OFF the relay contact 81YUa via the driving circuit 82*a*. This stops supply of motor current to the motor 13*a* so as to stop the closing motion of the front passenger's seat window.

If the automatically closing operation is performed to the passenger's seat main switch 33*a*, the contacts 61Ua and 61Aa are turned ON. Similarly to the case where the manually closing operation is performed, the relay contact 81YUa is turned ON and motor current flows in the forward direction to the motor 13*a*, so as to close the front passenger's seat window. Even when the automatically closing operation to the passenger's seat main switch 33*a* is subsequently stopped and the contacts 61Ua and 61Aa are turned OFF, the opening-closing controller 104 keeps the state where the relay contact 81YUa is ON via the driving circuit 82*a* until the front passenger's seat window is fully closed. The front passenger's seat window is thus automatically fully closed.

If the manually opening operation or the automatically opening operation is performed to the passenger's seat main switch 33*a* while the front passenger's seat window is automatically closing and the operation detector 101 detects that the contact 61Da is ON, the opening-closing controller 104 turns OFF the relay contact 81YUa via the driving circuit 82*a*. This stops the automatically closing motion of the front passenger's seat window.

{When Opening Operation is Performed to Passenger's Seat Main Switch 33*a*}

Figure 6:
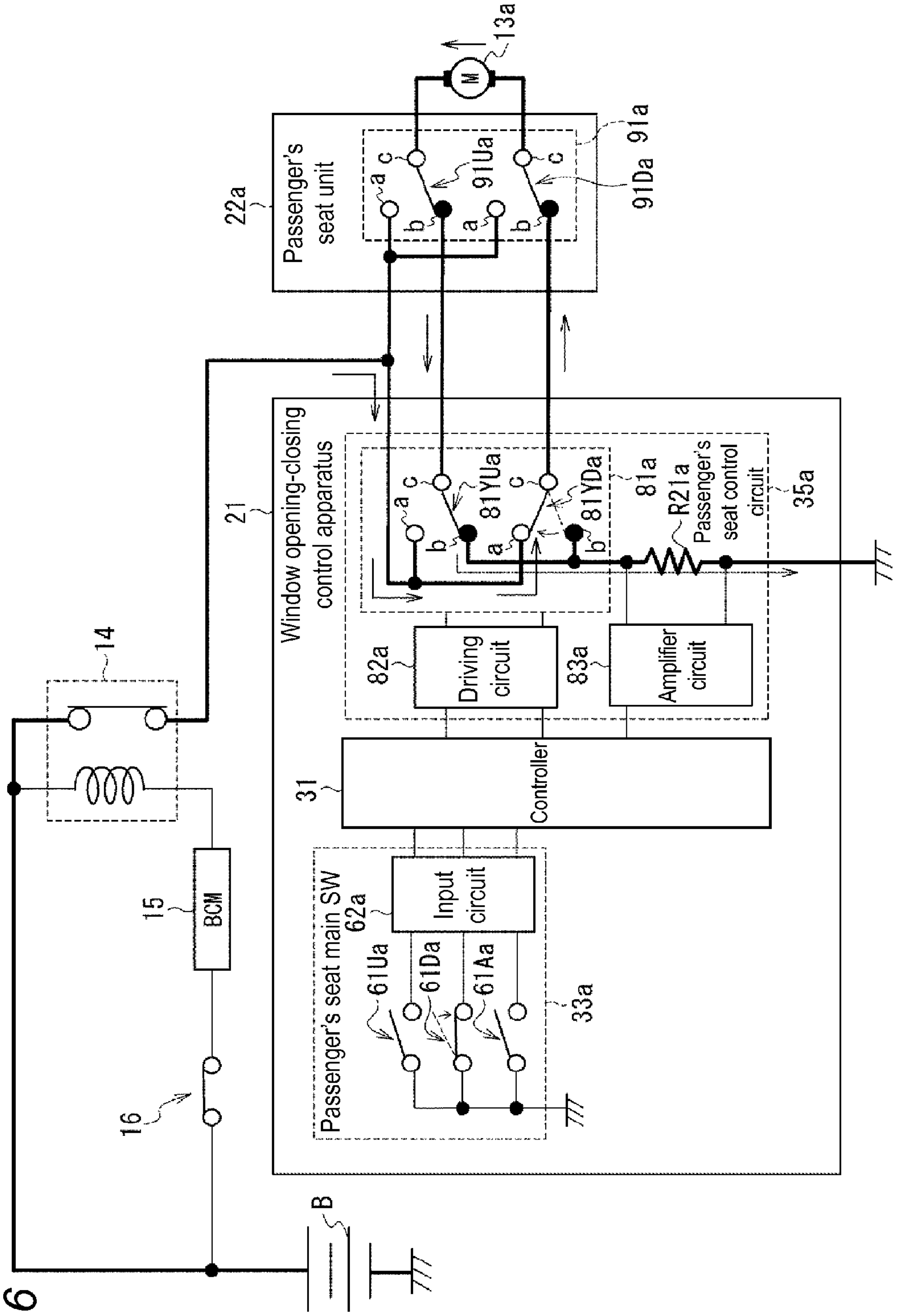
FIG. 6 is a diagram depicting a state of the automatic window system when the manually opening operation is performed to the passenger's seat main switch.

FIG. 6 depicts a state of the automatic window system 1 when the manually opening operation is performed to the passenger's seat main switch 33*a*.

If the manually opening operation is performed to the passenger's seat main switch 33*a*, the contact 61Da is turned ON. If the operation detector 101 detects that the contact 61Da is ON, the opening-closing controller 104 turns ON the relay contact 81YDa via the driving circuit 82*a*. In this case, current flows from the power supply B to ground via the main relay 14, the terminal a of the relay contact 81YDa, the terminal b of the contact 91Da, the motor 13*a*, the terminal b of the contact 91Ua, the terminal b of the relay contact 81YUa, and the resistor R21*a*. This causes motor current to flow in the backward direction to the motor 13*a*, so as to open the front passenger's seat window.

If the manually opening operation to the passenger's seat main switch 33*a* is stopped, the contact 61Da is turned OFF. If the operation detector 101 detects that the contact 61Da is OFF, the opening-closing controller 104 turns OFF the relay contact 81YDa via the driving circuit 82*a*. This stops supply of motor current to the motor 13*a* so as to stop the opening motion of the front passenger's seat window.

If the automatically opening operation is performed to the passenger's seat main switch 33*a*, the contacts 61Da and 61Aa are turned ON. Similarly to the case where the manually opening operation is performed, the relay contact 81YDa is turned ON and motor current flows in the backward direction to the motor 13*a*, so as to open the front passenger's seat window. Even when the automatically opening operation to the passenger's seat main switch 33*a* is subsequently stopped and the contacts 61Da and 61Aa are turned OFF, the opening-closing controller 104 keeps the state where the relay contact 81YDa is ON via the driving circuit 82*a* until the front passenger's seat window is fully opened. The front passenger's seat window is thus automatically fully opened.

If the manually closing operation or the automatically closing operation is performed to the passenger's seat main switch 33*a* while the front passenger's seat window is automatically opening and the operation detector 101 detects that the contact 61Ua is ON, the opening-closing controller 104 turns OFF the relay contact 81YDa via the driving circuit 82*a*. This stops the automatically opening motion of the front passenger's seat window.

Although description will not be made in detail, the rear right or rear left passenger's seat window can be opened or closed in a similar manner when the passenger's seat main switch 33*b* or 33*c* is operated.

{When Closing Operation is Performed to Passenger's Seat Sub Switch 91*a*}

Figure 7:
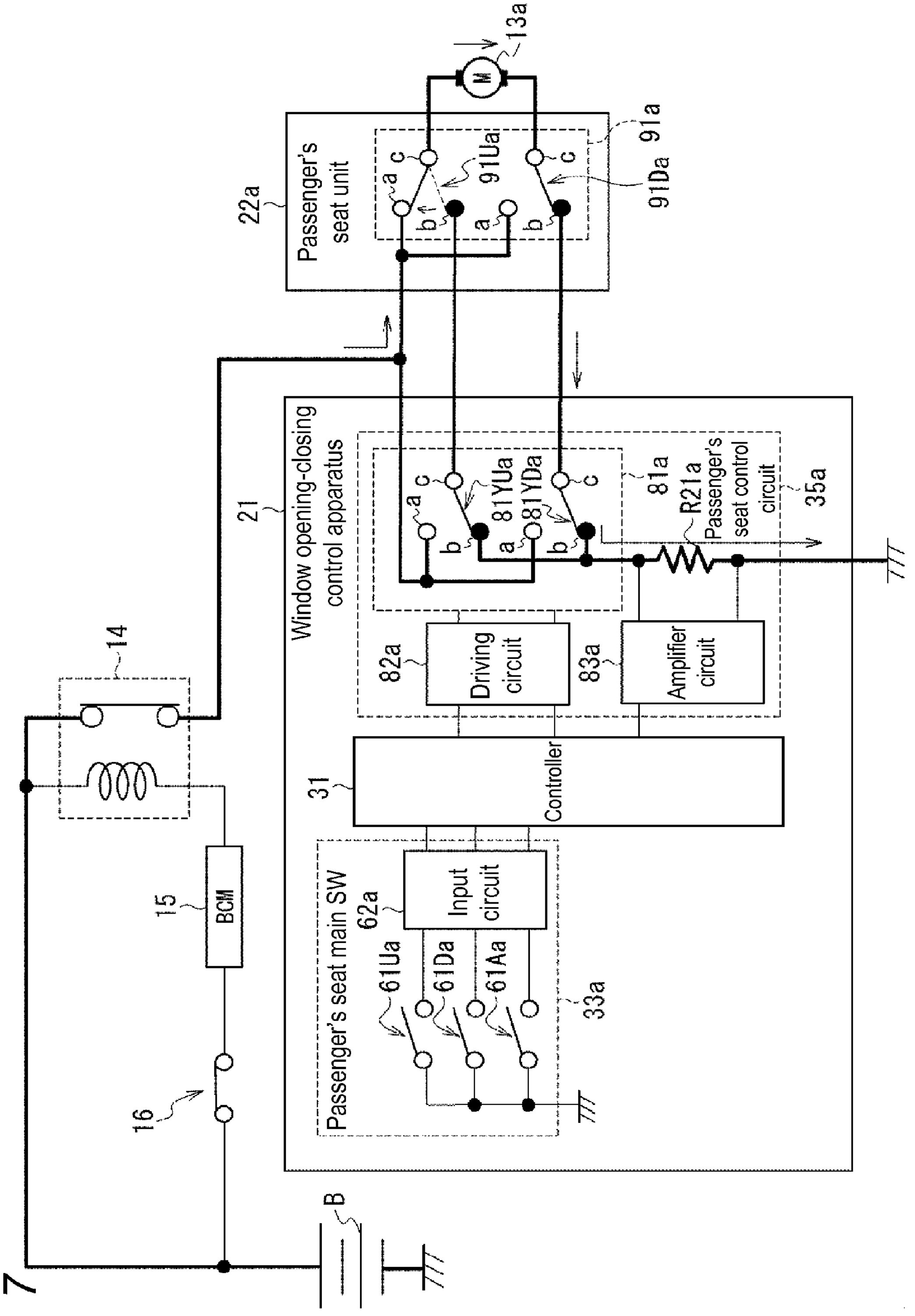
FIG. 7 is a diagram depicting a state of the automatic window system when closing operation is performed to a passenger's seat sub switch.

FIG. 7 depicts a state of the automatic window system 1 when the closing operation is performed to the passenger's seat sub switch 91*a*.

If the closing operation is performed to the passenger's seat sub switch 91*a*, the contact 91Ua is turned ON. In this case, current flows from the power supply B to ground via the main relay 14, the terminal a of the contact 91Ua, the motor 13*a*, the terminal b of the contact 91Da, the terminal b of the relay contact 81YDa, and the resistor R21*a*. This causes motor current to flow in the forward direction to the motor 13*a*, so as to close the front passenger's seat window.

If the closing operation to the passenger's seat sub switch 91*a* is stopped, the contact 91Ua is turned OFF. This stops supply of motor current to the motor 13*a* so as to stop the closing motion of the front passenger's seat window.

{When Opening Operation is Performed to Passenger's Seat Sub Switch 91*a*}

Figure 8:
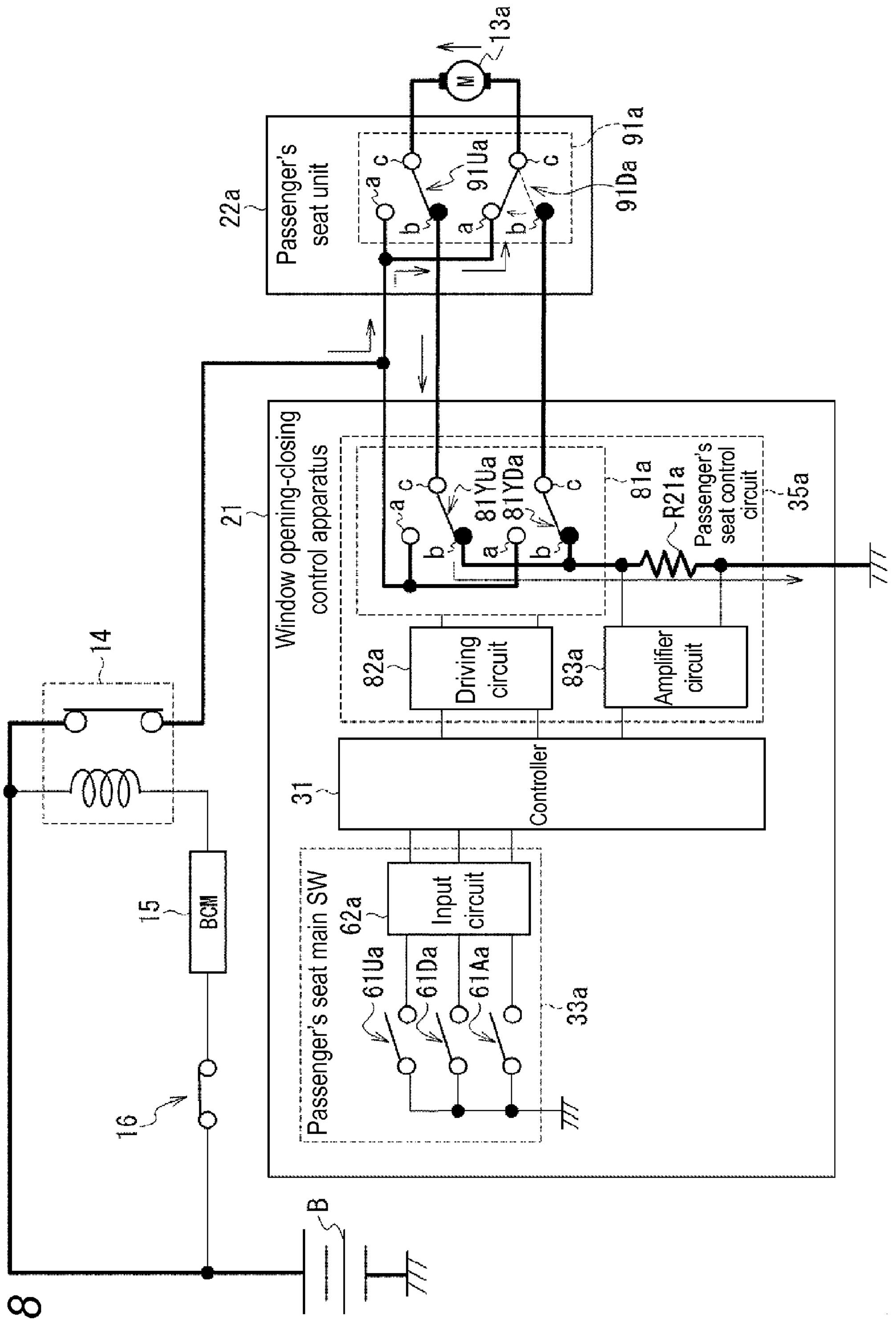
FIG. 8 is a diagram depicting a state of the automatic window system when opening operation is performed to the passenger's seat sub switch.

FIG. 8 depicts a state of the automatic window system 1 when the opening operation is performed to the passenger's seat sub switch 91*a*.

If the opening operation is performed to the passenger's seat sub switch 91*a*, the contact 91Da is turned ON.

In this case, current flows from the power supply B to ground via the main relay 14, the terminal a of the contact 91Da, the motor 13*a*, the terminal b of the contact 91Ua, the terminal b of the relay contact 81YUa, and the resistor R21*a*. This causes motor current to flow in the backward direction to the motor 13*a*, so as to open the front passenger's seat window.

If the opening operation to the passenger's seat sub switch 91*a* is stopped, the contact 91Da is turned OFF. This stops supply of motor current to the motor 13*a* so as to stop the opening motion of the front passenger's seat window.

As described above, when operation is performed to the passenger's seat sub switch 91*a*, the front passenger's seat window can be opened or closed with no control by the window opening-closing control apparatus 21.

Although description will not be made in detail, the rear right or rear left passenger's seat window can be opened or closed in a similar manner when the passenger's seat sub switch 91*b* or 91*c* is operated.

{Method of Detecting Position of Each Vehicle Window}

An exemplary method of detecting a position of each vehicle window will be described next with reference to FIG. 9.

The window position detector 102 always monitors motor current flowing through the motors 12 and 13*a* to 13*c* on the basis of voltage received from the amplifier circuits 73 and 83*a* to 83*c*, respectively. Motor current flowing through each of the motors has a ripple. In a state where no interposition occurs, the ripple of the motor current has a stable waveform as depicted in the upper area of FIG. 9.

Figure 9:
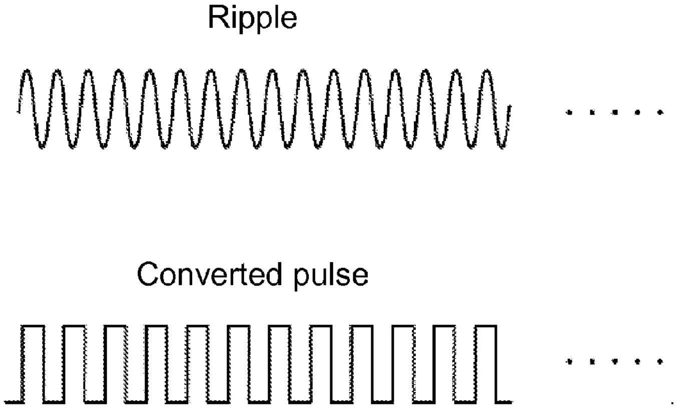
FIG. 9 is an explanatory diagram on a method of detecting a position of each vehicle window in an opening-closing direction.

The window position detector 102 converts the ripple of the motor current to a pulse train depicted in the lower area of FIG. 9. The window position detector 102 calculates rotational speed of each of the motors from the pulse train depicted in FIG. 9, and detects positions of the driver's seat window and the passenger's seat windows in accordance with the calculated motor rotational speed. This configuration requires no sensor for detection of each window position.

The controller 31 does not receive signals indicating states of the contacts 91Ua and 91Da of the passenger's seat sub switch 91*a* in this case, so that the controller 31 cannot detect the states of the contacts 91Ua and 91Da. The operation detector 101 cannot detect whether the opening operation or the closing operation is performed to the passenger's seat sub switch 91*a* directly from the states of the contacts 91Ua and 91Da.

The motor 13*a* receives a larger load for closing the front passenger's seat window rather than for opening the front passenger's seat window by an amount of lifting upward the window. Accordingly, motor current flowing through the motor 13*a* is larger for closing the window than motor current for opening the window.

In view of this, if the passenger's seat sub switch 91*a* is operated to open or close the front passenger's seat window, the operation detector 101 detects an operation direction (the closing operation or the opening operation) of the passenger's seat sub switch 91*a* in accordance with an amount of motor current at the motor 13*a*. Similarly, the window position detector 102 detects a motion direction (whether closing or opening) of the window in accordance with the amount of the motor current at the motor 13*a*.

This applies to the case where the passenger's seat sub switch 91*b* is operated to open and close the rear right passenger's seat window as well as to the case where the passenger's seat sub switch 91*c* is operated to open and close the rear left passenger's seat.

When any one of the driver's seat main switch 32 and the passenger's seat main switches 33*a* to 33*c* is operated to open or close the corresponding window, the controller 31 receives a signal indicating a state of the contact of the switch. The window position detector 102 can thus detect a motion direction of each window not in accordance with an amount of motor current. It is also possible to detect the motion direction of each window in accordance with the amount of motor current when any one of the driver's seat main switch 32 and the passenger's seat main switches 33*a* to 33*c* is operated to open or close the corresponding window.

{Method of Detecting Interposition at Each Vehicle Window}

An exemplary method of detecting interposition at each window will be described next with reference to FIGS. 10 to 16.

Figure 10:
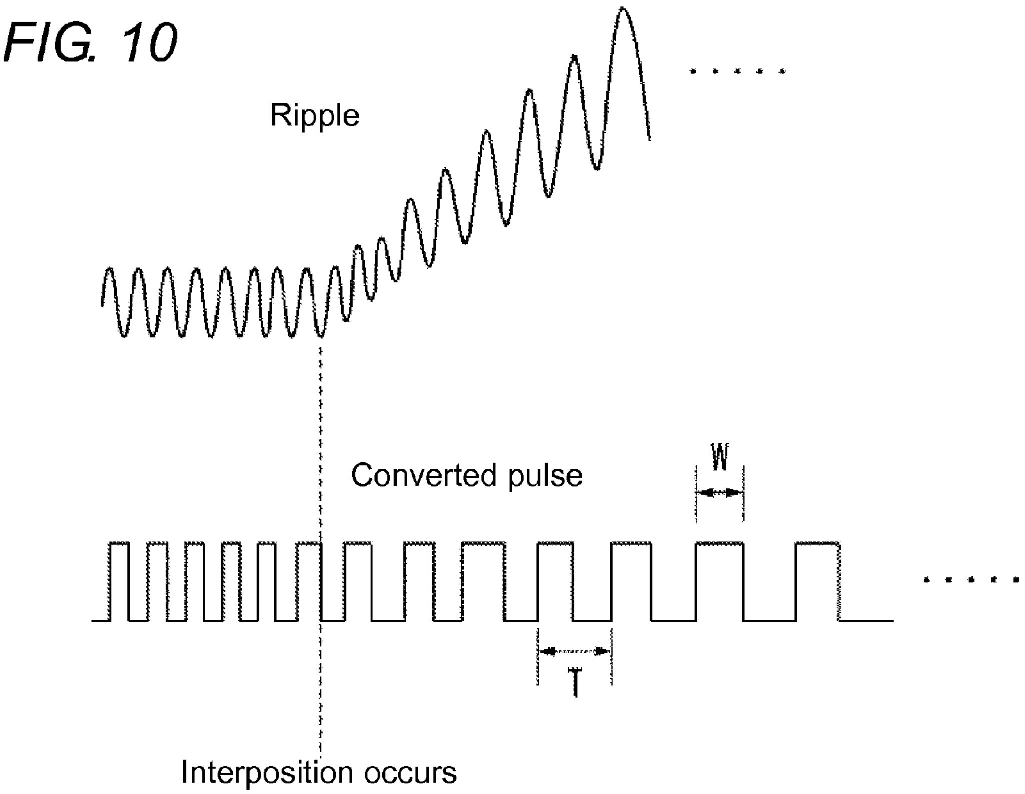
FIG. 10 is an explanatory diagram on a method of detecting interposition at each vehicle window.

If interposition occurs, motor current increases in current level and has a ripple in an unstable waveform with a longer period as depicted in the upper area of FIG. 10.

The interposition detector 103 monitors a change in period T of the ripple and determines that interposition has occurred if the period T reaches or exceeds a predetermined level. The interposition detector 103 can alternatively determine that interposition has occurred if a pulse width W, in place of the period T, reaches or exceeds a predetermined level. Interposition can be detected in accordance with a ripple of motor current in these manners.

Provision of only this detection method according to a ripple of motor current may cause erroneous interposition detection if, for example, the passenger's seat sub switch 91 is operated while the passenger's seat main switch 33 for a same window is operated.

Figure 11:
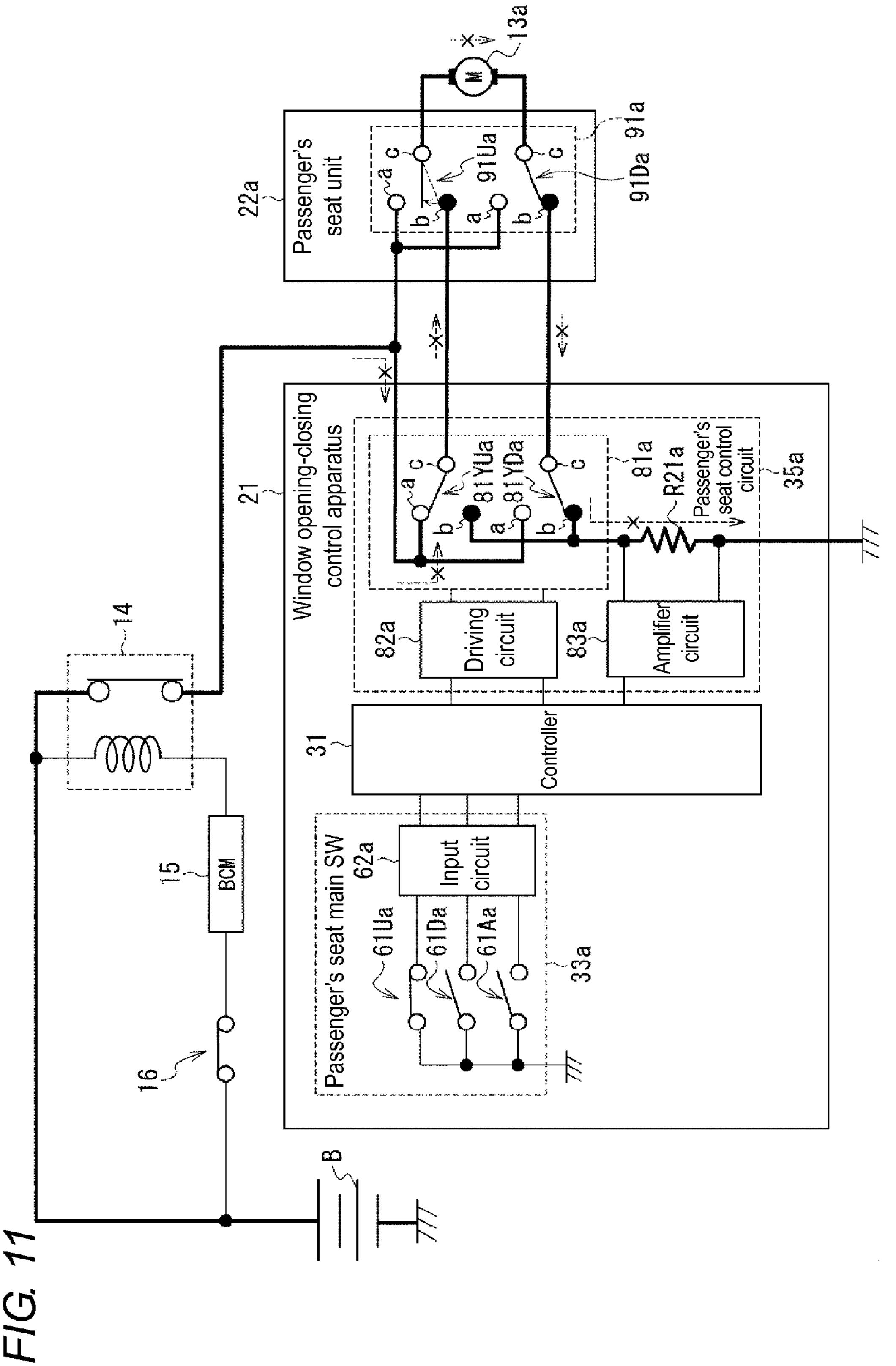
FIG. 11 is a diagram depicting a state of the automatic window system when the closing operation is performed to the passenger's seat sub switch while the manually closing operation is performed to the passenger's seat main switch.
Figure 12:
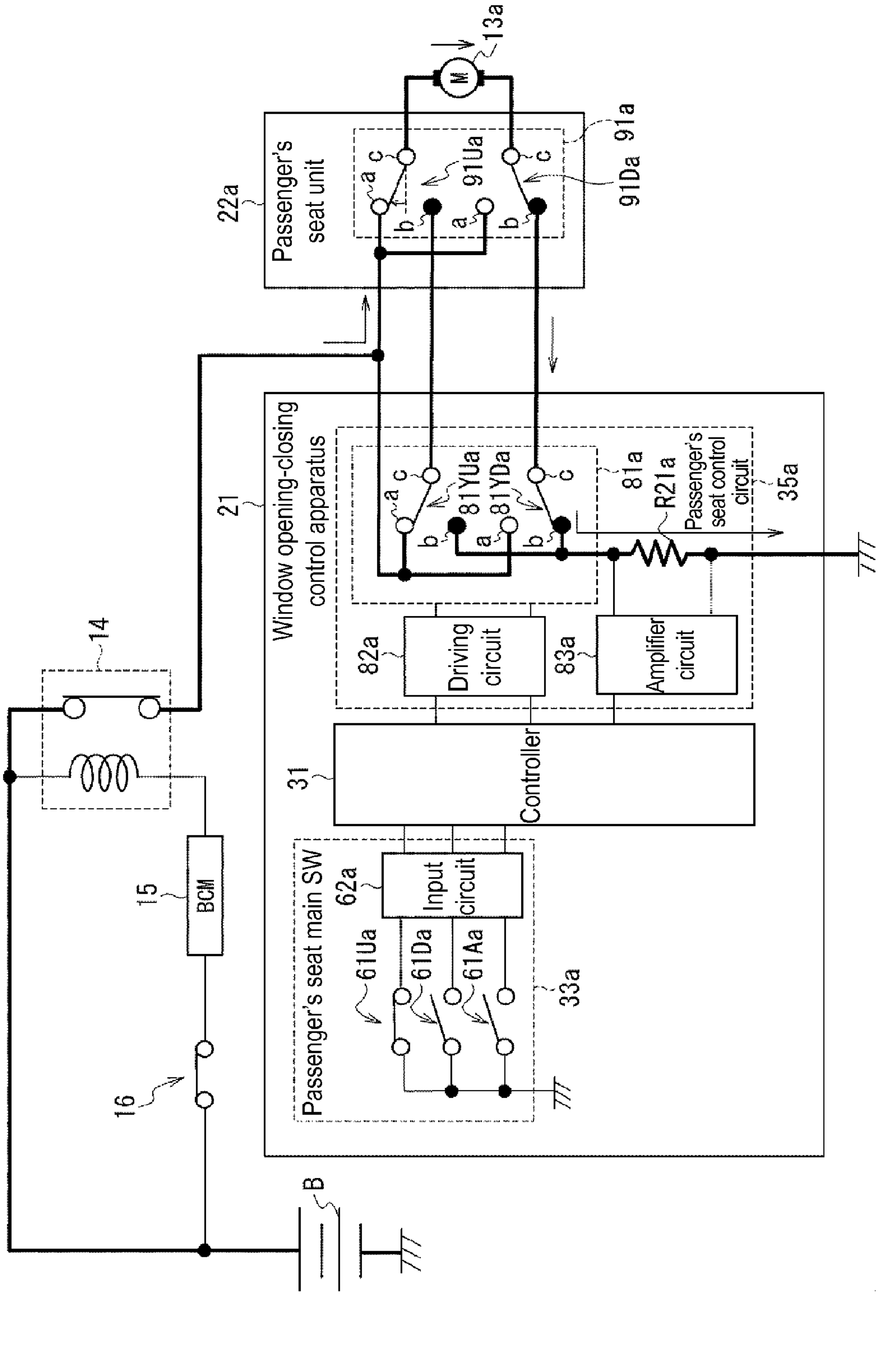
FIG. 12 is a diagram depicting a state of the automatic window system after the closing operation is performed to the passenger's seat sub switch while the manually closing operation is performed to the passenger's seat main switch.

Motor current at the motor 13*a* stops temporarily if the closing operation is performed to the passenger's seat sub switch 91*a* while the manually closing operation is performed to the passenger's seat main switch 33*a* as depicted in FIG. 5 referred to earlier. Specifically, as depicted in FIG. 11, the contact 91Ua comes into a contactless state when the closing operation to the passenger's seat sub switch 91*a* causes state transition from connection between the terminal c and the terminal b at the contact 91Ua into connection between the terminal c and the terminal a. This stops motor current at the motor 13*a* so as to temporarily stop the closing motion of the front passenger's seat window. When the terminal a and the terminal c at the contact 91Ua are thereafter connected to each other (the contact 91Ua is turned ON) as depicted in FIG. 12, motor current flows along the same route described with reference to FIG. 7 referred to earlier, so as to restart closing the front passenger's seat window.

In this manner, no ripple of motor current is detected if the closing operation is performed to the passenger's seat sub switch 91*a* while the manually closing operation is performed to the passenger's seat main switch 33*a* and the motor current stops temporarily. The ripple of the motor current has the period T or the pulse width W at not less than the predetermined level in this case, to cause erroneous interposition detection at the front passenger's seat window.

This applies to an exemplary case where the automatically closing operation is performed to the passenger's seat main switch 33*a* and the closing operation is performed to the passenger's seat sub switch 91*a* during the automatically closing motion of the front passenger's seat window.

Figure 13:
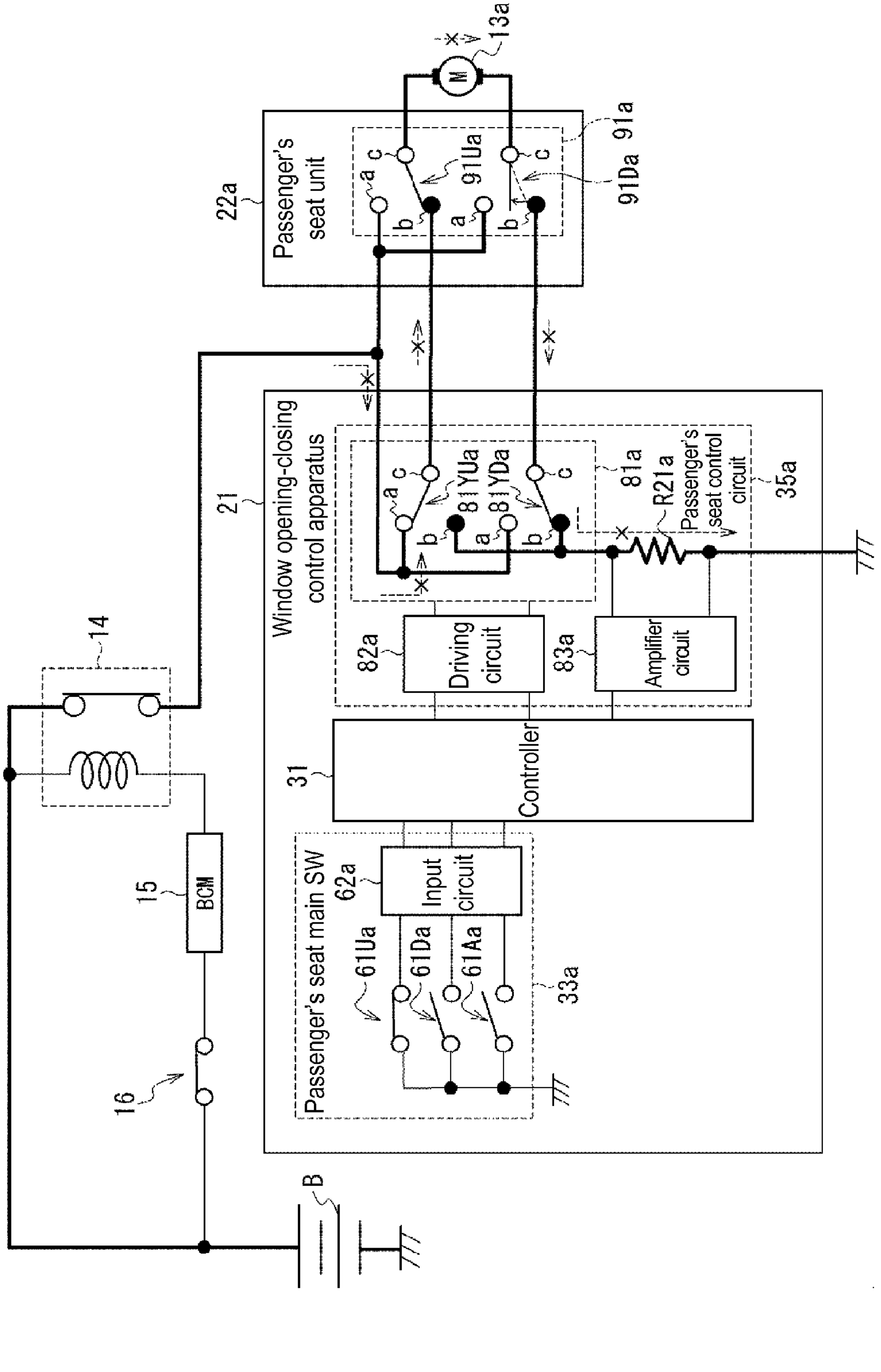
FIG. 13 is a diagram depicting a state of the automatic window system when the opening operation is performed to the passenger's seat sub switch while the manually closing operation is performed to the passenger's seat main switch.
Figure 14:
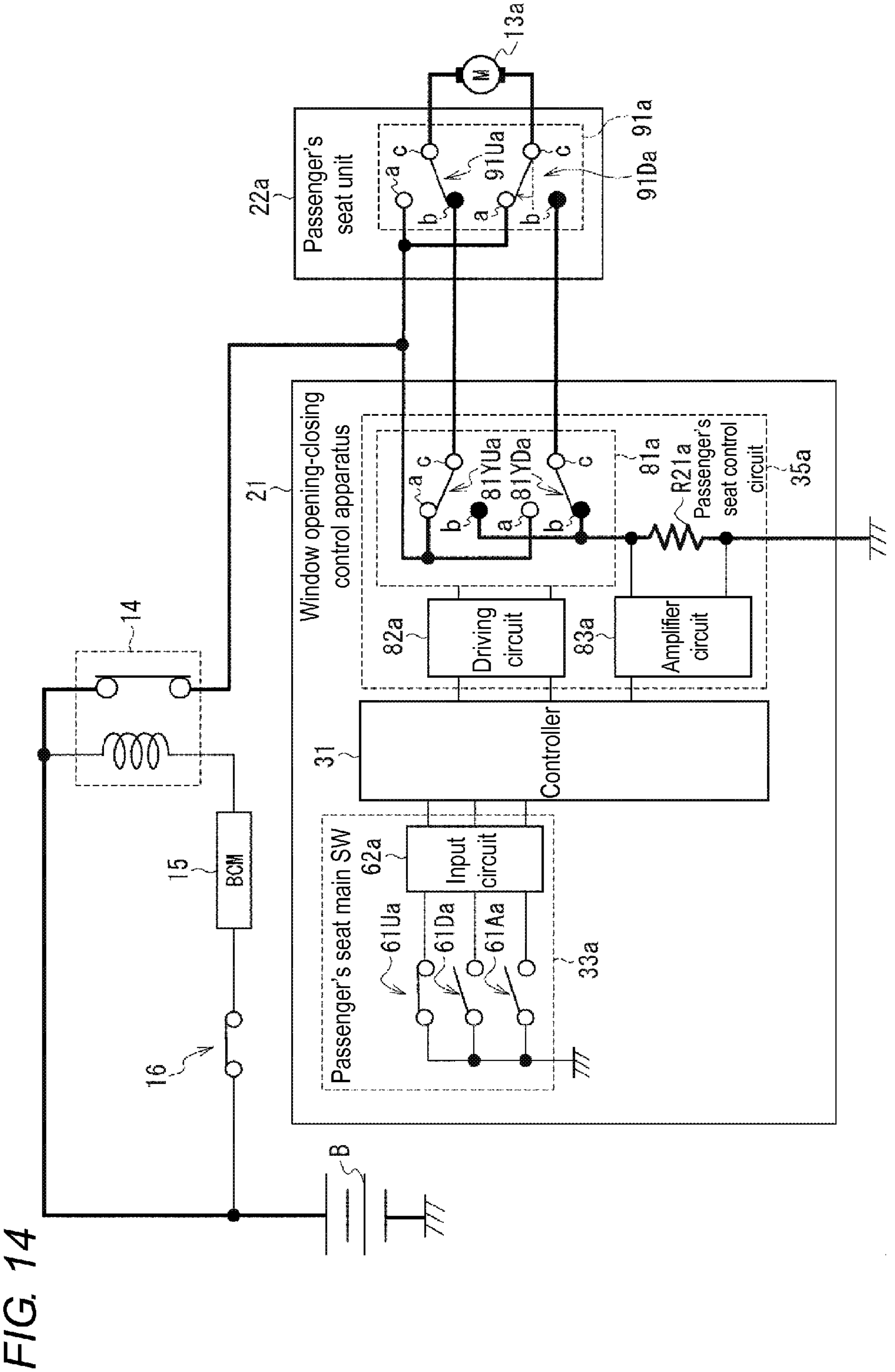
FIG. 14 is a diagram depicting a state of the automatic window system after the opening operation is performed to the passenger's seat sub switch while the manually closing operation is performed to the passenger's seat main switch.

Motor current at the motor 13*a* stops if the opening operation is performed to the passenger's seat sub switch 91*a* while the manually closing operation is performed to the passenger's seat main switch 33*a*. Specifically, as depicted in FIG. 13, the contact 91Da comes into the contactless state when the opening operation to the passenger's seat sub switch 91*a* causes state transition from connection between the terminal c and the terminal b at the contact 91Da into connection between the terminal c and the terminal a. This stops motor current at the motor 13*a* so as to stop the closing motion of the front passenger's seat window. Even if the terminal c and the terminal a at the contact 91Da are thereafter connected to each other (the contact 91Da is turned ON) as depicted in FIG. 14, motor current does not flow and the front passenger's seat window remains stopped.

In this manner, no ripple of motor current is detected if the opening operation is performed to the passenger's seat sub switch 91*a* while the manually closing operation is performed to the passenger's seat main switch 33*a* and the motor current stops. The ripple of the motor current has the period T or the pulse width W at not less than the predetermined level in this case, to cause erroneous interposition detection at the front passenger's seat window.

This applies to an exemplary case where the automatically closing operation is performed to the passenger's seat main switch 33*a* and the opening operation is performed to the passenger's seat sub switch 91*a* during the automatically closing motion of the front passenger's seat window.

In view of this, such erroneous interposition detection can be prevented by detection of interposition according to a ripple of motor current as well as according to a change in motor current.

Figure 15:
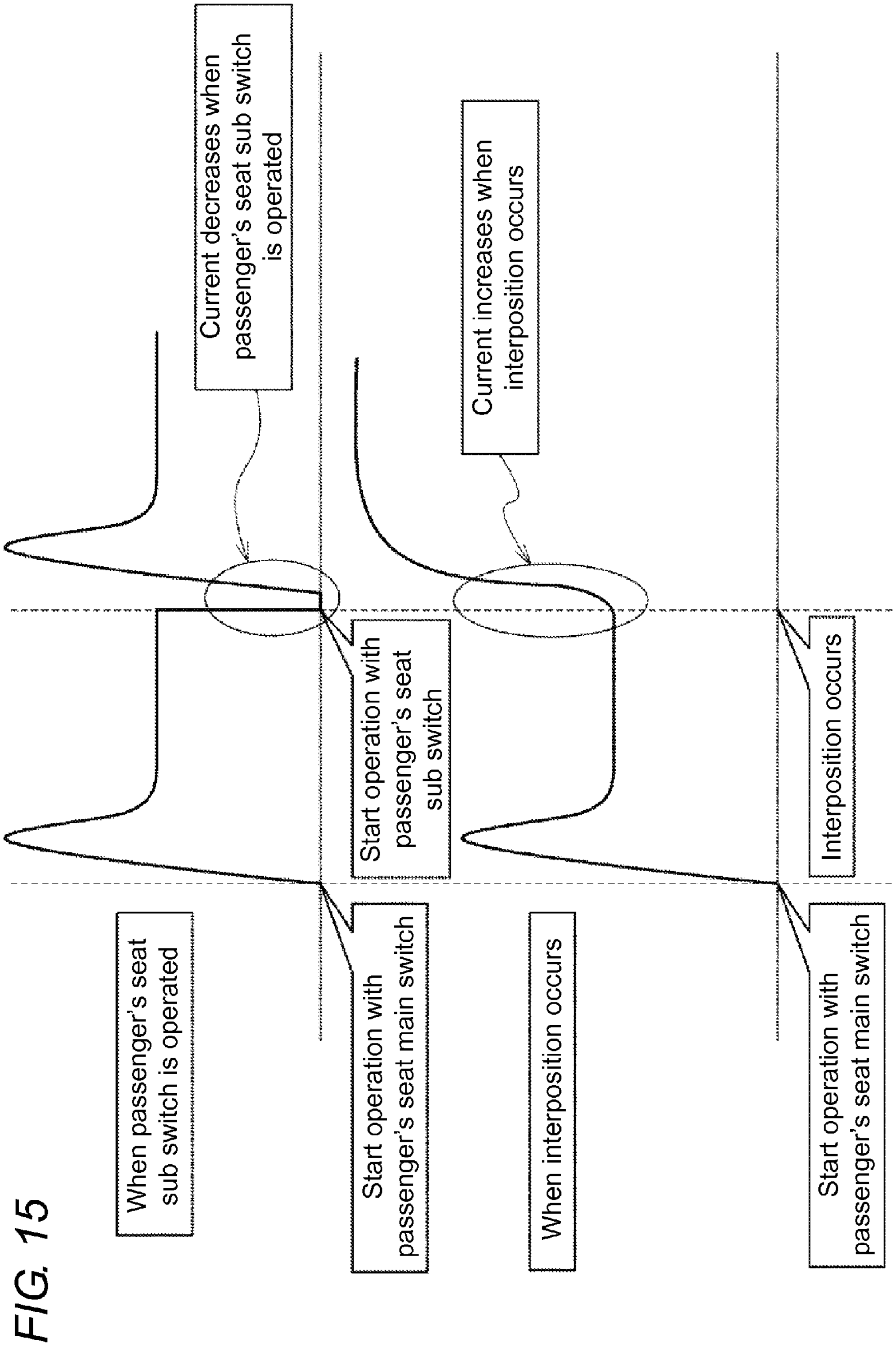
FIG. 15 is a comparative graph on changes in motor current between a case where the closing operation is performed to the passenger's seat sub switch and a case where interposition occurs at the front passenger's seat window while the manually closing operation is performed to the passenger's seat main switch.

FIG. 15 is a comparative graph on changes in motor current at the motor 13*a* between a case where the closing operation is performed to the passenger's seat sub switch 91*a* while the manually closing operation is performed to the passenger's seat main switch 33*a* and a case where interposition occurs at the front passenger's seat window while the manually closing operation is performed to the passenger's seat main switch 33*a*. The upper indication in FIG. 15 relates to the case where the closing operation is performed to the passenger's seat sub switch 91*a* whereas the lower indication relates to the case where interposition occurs at the front passenger's seat window. FIG. 15 has the ordinate axis indicating a motor current value at the motor 13*a* and the transverse axis indicating time.

As depicted in FIG. 5 referred to earlier, if the manually closing operation is initially performed to the passenger's seat main switch 33*a* and the relay contact 81YUa is turned ON, inrush current flows when the motor 13*a* starts. As a result, as indicated in the upper and lower areas of FIG. 15, motor current increases rapidly. The motor current then decreases and comes into a stable state.

If the closing operation is performed to the passenger's seat sub switch 91*a*, the contact 91Ua comes into the contactless state and the motor current stops temporarily as described above. If the contact 91Ua is subsequently turned ON, inrush current flows when the motor 13*a* starts and the motor current thereafter decreases and comes into the stable state, similarly to the case where the manually closing operation is performed to the passenger's seat main switch 33*a*.

In contrast, if interposition occurs at the front passenger's seat window, the motor 13*a* is locked and the motor current does not decrease but increases rapidly to be kept at a value higher than an ordinary level.

Motor current at the motor 13*a* varies similarly to the upper indication in FIG. 15 if the automatically closing operation is performed to the passenger's seat main switch 33*a* and the closing operation is performed to the passenger's seat sub switch 91*a* after the front passenger's seat window starts the automatically closing motion. Motor current at the motor 13*a* varies similarly to the lower indication in FIG. 15 if the automatically closing operation is performed to the passenger's seat main switch 33*a* and interposition occurs at the front passenger's seat window after the front passenger's seat window starts the automatically closing motion.

Figure 16:
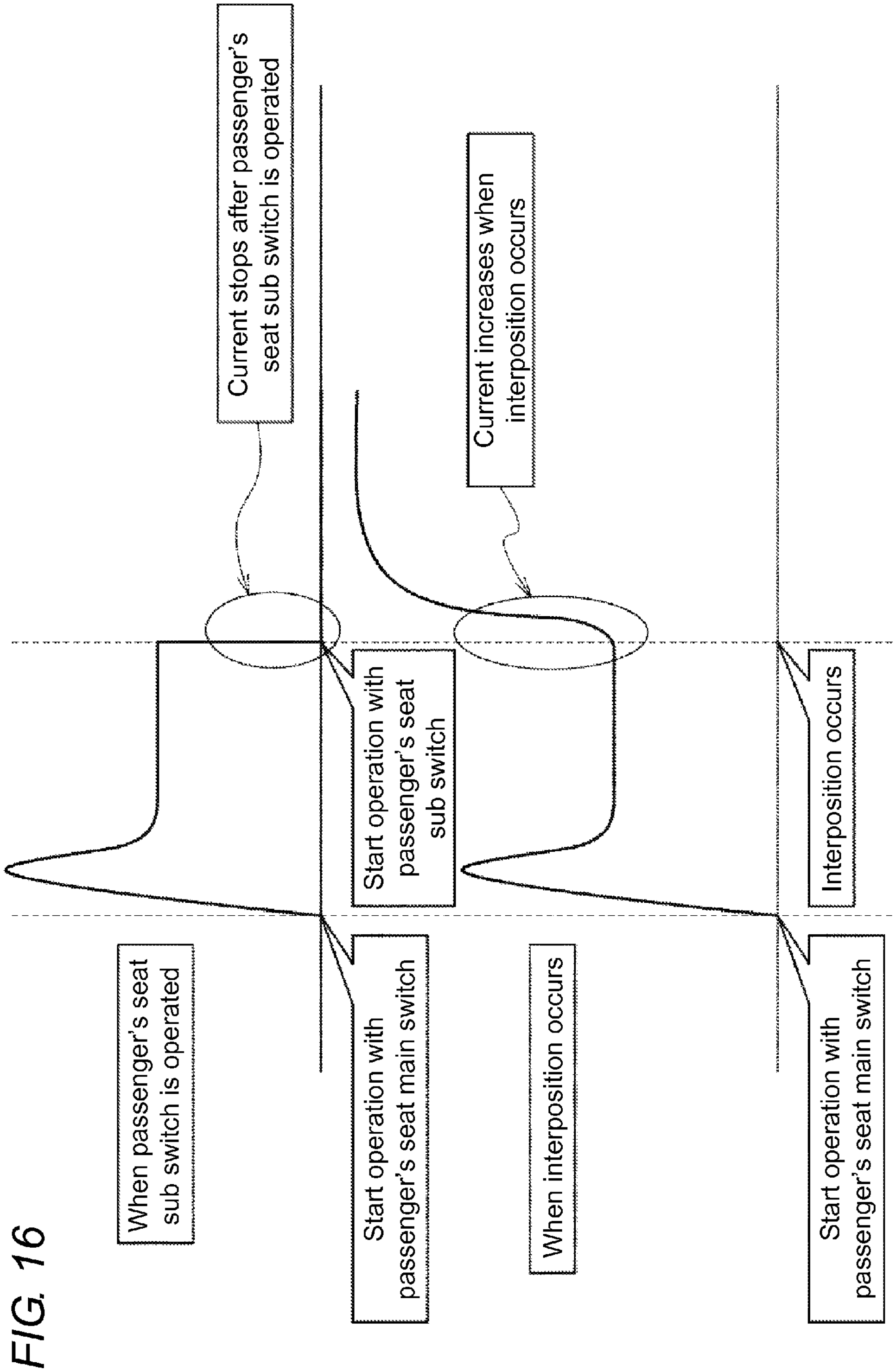
FIG. 16 is a comparative graph on changes in motor current between a case where the opening operation is performed to the passenger's seat sub switch and a case where interposition occurs at the front passenger's seat window while the manually closing operation is performed to the passenger's seat main switch.

FIG. 16 is a comparative graph on changes in motor current at the motor 13*a* between a case where the opening operation is performed to the passenger's seat sub switch 91*a* while the manually closing operation is performed to the passenger's seat main switch 33*a* and a case where interposition occurs at the front passenger's seat window while the manually closing operation is performed to the passenger's seat main switch 33*a*. The upper indication in FIG. 16 relates to the case where the opening operation is performed to the passenger's seat sub switch 91*a* whereas the lower indication relates to the case where interposition occurs at the front passenger's seat window. The lower indication in FIG. 16 is identical with the lower indication in FIG. 15.

As described above, motor current stops after the opening operation is performed to the passenger's seat sub switch 91*a* while the manually closing operation is performed to the passenger's seat main switch 33*a*.

Motor current at the motor 13*a* varies similarly to the upper indication in FIG. 16 if the automatically closing operation is performed to the passenger's seat main switch 33*a* and the opening operation is performed to the passenger's seat sub switch 91*a* after the front passenger's seat window starts the automatically closing motion.

In view of this, the interposition detector 103 determines that interposition has occurred at the front passenger's seat window if, for example, the ripple of the motor current at the motor 13*a* has the period T reaching or exceeding the predetermined level and the motor current does not decrease to be less than a predetermined first threshold but increases to be not less than a predetermined second threshold. The first threshold can be set to be smaller than the minimum value of the motor current flowing to the motor 13*a* when the front passenger's seat window is closing. The second threshold can be set to be larger than the maximum value of the motor current in the stable state after inrush current flows to the motor 13*a* when the front passenger's seat window is closing.

Instead of determining that interposition has occurred at the front passenger's seat window when the motor current at the motor 13*a* reaches or exceeds the second threshold, the interposition detector 103 can determine that interposition has occurred at the front passenger's seat window after this state continues for not less than a predetermined prescribed time period. The prescribed time period can be set to be longer than duration of inrush current at the motor 13*a*.

The interposition detector 103 alternatively determines that interposition has occurred at the front passenger's seat window if, for example, the ripple of the motor current at the motor 13*a* has the period T reaching or exceeding the predetermined level and the motor current does not decrease to be less than the first threshold but increases at a predetermined increase rate. The increase rate of motor current indicates an amount of increased motor current per a predetermined unit time period (e.g. 100 ms). The predetermined increase rate can be set to be larger than a fluctuation rate of motor current due to a ripple.

When motor current at the motor 13*a* once becomes less than the first threshold and then increases, the interposition detector 103 determines that no interposition occurs at the front passenger's seat window even if the ripple of the motor current has the period T reaching or exceeding the predetermined level and the motor current increases to be not less than the second threshold. When motor current at the motor 13*a* once becomes less than the first threshold and then increases, the interposition detector 103 alternatively determines that no interposition occurs at the front passenger's seat window even if the ripple of the motor current has the period T reaching or exceeding the predetermined level and the motor current increases at the predetermined increase rate. When motor current is continuously less than the first threshold, the interposition detector 103 still alternatively determines that no interposition occurs at the front passenger's seat window even if the ripple of the motor current at the motor 13*a* has the period T reaching or exceeding the predetermined level. When motor current becomes less than the first threshold, the interposition detector 103 thus determines that no interposition occurs at the front passenger's seat window even if the motor current at the motor 13*a* has the period T reaching or exceeding the predetermined level.

The interposition detector 103 can determine interposition at the front passenger's seat window not in accordance with the period T of the ripple of motor current at the motor 13*a* but only in accordance with the change in motor current.

Interposition at the window can be detected for any one of the other seats, namely, the driver's seat as well as the rear right and rear left passenger's seats, through a similar determination method. However, the driver's seat window has no conflict between the main switch and the sub switch, so that determination of no interposition may not be required in the above case where motor current is less than the first threshold.

The interposition detector 103 determines that interposition has not occurred even though the above condition is satisfied, if the interposition detector 103 determines that no interposition can possibly occur from detection results on operation to the driver's seat main switch 32 and the passenger's seat main switches 33*a* to 33*c* and detection results on positions and motion directions of the respective seat windows. For example, interposition cannot occur when a window is open.

When the manually closing operation is performed to the passenger's seat main switch 33*a*, the operation detector 101 can determine that the closing operation is performed to the passenger's seat sub switch 91*a* if motor current at the motor 13*a* decreases to be less than the first threshold and then increases to be not less than a predetermined third threshold within a predetermined first prescribed time period. The third threshold can be set to be larger than the first threshold, as well as to the average value of motor current in the stable state after inrush current flows to the motor 13*a* while the front passenger's seat window is closing.

When the manually closing operation is performed to the passenger's seat main switch 33*a*, the operation detector 101 can determine that the opening operation is performed to the passenger's seat sub switch 91*a* if motor current at the motor 13*a* is less than the first threshold continuously for not less than a predetermined second prescribed time period.

Similarly, the operation detector 101 can determine that the closing operation is performed to the passenger's seat sub switch 91*a* if, for example, during the automatically closing motion of the front passenger's seat window, motor current at the motor 13*a* decreases to be less than the first threshold and then increases to be not less than the predetermined third threshold within the first prescribed time period. The operation detector 101 can also determine that the opening operation is performed to the passenger's seat sub switch 91*a* if, for example, during the automatically closing motion of the front passenger's seat window, motor current at the motor 13*a* is less than the first threshold continuously for not less than the predetermined second prescribed time period.

The first and second prescribed time periods can be set in accordance with a time period required for transition from the OFF state to the ON state at the contacts 91Ua and 91Da of the passenger's seat sub switch 91*a*, for example.

The closing operation and the opening operation to each of the passenger's seat sub switches 91*b* and 91*c* can also be detected in manners similar to those for the passenger's seat sub switch 91*a*.

2. Modification Examples

Described below are modification examples of the embodiment according to the disclosure described above.

The above description exemplifies the case where there are the three passenger's seat windows, while the number of passenger's seat windows can be set optionally. The numbers of the motors 13, the passenger's seat units 22, the passenger's seat main switches 33, and the passenger's seat control circuits 35 can be increased or decreased in accordance with the number of the passenger's seat windows.

The main relay 14 can be replaced with a manual switch or the like, or the ignition switch 16 can be provided directly.

The positions of the resistors (motor current detectors) configured to detect motor current at the motor 13 are not limited to the positions mentioned earlier. For example, a resistor can be provided between the terminal b of the relay contact 81YUa and ground, another resistor can be provided between the terminal b of the relay contact 81YDa and ground, and the resistors can be each connected with an amplifier circuit, so as to enable detection of motor current at the motor 13*a*. Alternatively, a resistor can be provided between the terminal c of the relay contact 81YUa and the terminal b of the contact 91Ua, another resistor can be provided between the terminal c of the relay contact 81YDa and the terminal b of the contact 91Da, and the resistors can be each connected with an amplifier circuit, so as to enable detection of motor current at the motor 13*a*. In these manners, the resistors can be provided anywhere on the route of current flowing to the passenger's seat motor 13.

Motor current at each of the motors can be detected in accordance with a method other than the above method of measuring voltage at the both ends of the resistor.

The disclosure is applicable to a vehicle of any type provided with an automatic window function.

Embodiments of the invention should not be limited to that described above but can be modified variously within the range not departing from the gist of the invention.

The invention claimed is:

1. A window opening-closing control system configured to control opening and closing a window at a driver's seat and a window at a passenger's seat other than the driver's seat in a vehicle, the window opening-closing control system comprising:

a passenger's seat unit provided at the passenger's seat; and a window opening-closing control apparatus provided at the driver's seat;

the passenger's seat unit including:

a momentary passenger's seat sub switch having a first contact operated to close the window at the passenger's seat and a second contact operated to open the window at the passenger's seat;

the first contact including:

a first common terminal connected to a first end of a passenger's seat motor configured to open and close the window at the passenger's seat;

a first normally opened terminal connected to a positive electrode of a power supply of the vehicle via a first wire, and connected to the first common terminal in response to operation for closing the window at the passenger's seat; and a first normally closed terminal;

the second contact including:

a second common terminal connected to a second end of the passenger's seat motor;

a second normally opened terminal connected to the positive electrode of the power supply via the first wire, and connected to the second common terminal in response to operation for opening the window at the passenger's seat; and a second normally closed terminal;

the window opening-closing control apparatus including:

a driver's seat main switch operated to open and close the window at the driver's seat;

a passenger's seat main switch having a third contact operated to close the window at the passenger's seat and a fourth contact operated to open the window at the passenger's seat, the passenger's seat main switch operated to open and close the window at the passenger's seat;

a motor current detector configured to detect current flowing to the passenger's seat motor;

a first relay circuit unit having a first relay contact and configured to be driven to close the window at the passenger's seat, the first relay contact including:

a first common relay terminal connected to the first normally closed terminal via a second wire;

a first normally opened terminal connected to the positive electrode of the power supply; and a first normally closed relay terminal connected to ground;

a second relay circuit unit having a second relay contact and configured to be driven to open the window at the passenger's seat, the second relay contact including:

a second common relay terminal connected to the second normally closed terminal via a third wire;

a second normally opened relay terminal connected to the positive electrode of the power supply; and a second normally closed relay terminal connected to ground;

an operation detector configured to detect operation to the driver's seat main switch and the passenger's seat main switch in accordance with a signal received from the driver's seat main switch and the passenger's seat main switch;

an opening-closing controller configured to control the first relay circuit unit and the second relay circuit unit in accordance with the operation to the passenger's seat main switch; and an interposition detector configured to detect a period of a ripple of the motor current detected by the motor current detector and to detect interposition at the window at the passenger's seat in accordance with a change of the period;

wherein when the first relay circuit unit or the second relay circuit unit is driven, the interposition detector does not determine that the window at the passenger's seat has interposition but determines that the passenger's seat sub switch is operated if the period of the ripple is not less than a predetermined period and the motor current decreases to be less than a predetermined first threshold.

2. The window opening-closing control system according to claim 1, wherein the interposition detector determines that the window at the passenger's seat has interposition if the period of the ripple is not less than the predetermined period and the motor current increases to be not less than a predetermined second threshold without decreasing to be less than the first threshold, or if the period of the ripple is not less than the predetermined period and the motor current increases at a predetermined or more increase rate without decreasing to be less than the first threshold.

3. The window opening-closing control system according to claim 1, wherein the operation detector determines that the operation for closing the window at the passenger's seat is performed to the passenger's seat sub switch if the motor current decreases to be less than the first threshold and then increases to be not less than a predetermined third threshold larger than the first threshold within a predetermined first prescribed time period while the operation for closing the window at the passenger's seat is performed to the passenger's seat main switch, and determines that the operation for opening the window at the passenger's seat is performed to the passenger's seat sub switch if the motor current decreases to be less than the first threshold and is then less than the first threshold continuously for not less than a predetermined second prescribed time period while the operation for closing the window at the passenger's seat is performed to the passenger's seat main switch.

4. The window opening-closing control system according to claim 1, wherein the window opening-closing control apparatus further includes:

a window position detector configured to detect a position of the window at the passenger's seat in an opening-closing direction in accordance with the ripple of the motor current.

5. The window opening-closing control system according to claim 1, wherein the motor current detector is a resistor provided on a route of the flowing motor current.

6. A window opening-closing control apparatus connected via second and third wires to a passenger's seat unit provided at a passenger's seat other than a driver's seat in a vehicle, the passenger's seat unit including:

a momentary passenger's seat sub switch having a first contact operated to close a window at the passenger's seat and a second contact operated to open the window at the passenger's seat;

the first contact including:

a first common terminal connected to a first end of a passenger's seat motor configured to open and close the window at the passenger's seat;

a first normally opened terminal connected to a positive electrode of a power supply of the vehicle via a first wire, and connected to the first common terminal in response to operation for closing the window at the passenger's seat; and a first normally closed terminal;

the second contact including:

a second common terminal connected to a second end of the passenger's seat motor;

a second normally opened terminal connected to the positive electrode of the power supply via the first wire, and connected to the second common terminal in response to operation for opening the window at the passenger's seat; and a second normally closed terminal;

the window opening-closing control apparatus provided at the driver's seat in the vehicle and configured to control opening and closing a window at the driver's seat and the window at the passenger's seat;

the window opening-closing control apparatus comprising:

a driver's seat main switch operated to open and close the window at the driver's seat;

a passenger's seat main switch having a third contact operated to close the window at the passenger's seat and a fourth contact operated to open the window at the passenger's seat, the passenger's seat main switch operated to open and close the window at the passenger's seat;

a motor current detector configured to detect current flowing to the passenger's seat motor;

a first relay circuit unit having a first relay contact and configured to be driven to close the window at the passenger's seat, the first relay contact including:

a first common relay terminal connected to the first normally closed terminal via the second wire;

a first normally opened relay terminal connected to the positive electrode of the power supply; and a first normally closed relay terminal connected to ground;

a second relay circuit unit having a second relay contact and configured to be driven to open the window at the passenger's seat, the second relay contact including:

a second common relay terminal connected to the second normally closed terminal via the third wire;

a second normally opened relay terminal connected to the positive electrode of the power supply; and a second normally closed relay terminal connected to ground;

an operation detector configured to detect operation to the driver's seat main switch and the passenger's seat main switch in accordance with a signal received from the driver's seat main switch and the passenger's seat main switch;

an opening-closing controller configured to control the first relay circuit unit and the second relay circuit unit in accordance with the operation to the passenger's seat main switch; and an interposition detector configured to detect a period of a ripple of the motor current detected by the motor current detector and to detect interposition at the window at the passenger's seat in accordance with a change of the period;

wherein when the first relay circuit unit or the second relay circuit unit is driven, the interposition detector does not determine that the window at the passenger's seat has interposition but determines that the passenger's seat sub switch is operated if the period of the ripple is not less than a predetermined period and the motor current decreases to be less than a predetermined threshold.

* * * * *